US012622345B2

(12) United States Patent

Herpy et al.

(10) Patent No.: US 12,622,345 B2
(45) Date of Patent: May 12, 2026

(54) ACTIVE NODE CONTROL PLANTING MODE

(71) Applicant: Motivo Engineering, LLC, Gardena, CA (US)

(72) Inventors: Alex Herpy, Long Beach, CA (US); Stephen Babin, Sagle, ID (US); Bryan Yaggi, Georgetown, TX (US); Itzhak Sapir, Irvine, CA (US); Travis Neidenfeuhr, San Clemente, CA (US); Allen Goad, Valencia, CA (US); Praveen Penmetsa, Newark, CA (US)

(73) Assignee: Motivo Engineering, LLC, Gardena, CA (US)

( * ) Notice: Subject to any disclaimer, the term of this patent is extended or adjusted under 35 U.S.C. 154(b) by 861 days.

(21) Appl. No.: 17/938,622

(22) Filed: Oct. 6, 2022

(65) Prior Publication Data

US 2023/0111610 A1      Apr. 13, 2023

Related U.S. Application Data

(60) Provisional application No. 63/253,313, filed on Oct. 7, 2021.

(51) Int. Cl.
| | |
|---|---|
| *A01C 11/02* | (2006.01) |
| *A01C 11/00* | (2006.01) |
| *A01C 11/04* | (2006.01) |

(52) U.S. Cl.
CPC .......... *A01C 11/025* (2013.01); *A01C 11/006* (2013.01); *A01C 11/04* (2013.01)

(58) Field of Classification Search
CPC ....... A01C 11/006; A01C 11/04; A01C 11/02; A01C 11/025
See application file for complete search history.

(56) References Cited

U.S. PATENT DOCUMENTS

| | | | | |
|---|---|---|---|---|
| 4,947,579 A | * | 8/1990 | Harrison | A01G 9/086 |
| | | | | 47/1.01 R |
| 5,402,740 A | * | 4/1995 | Kinoshita | A01C 11/02 |
| | | | | 414/508 |

(Continued)

FOREIGN PATENT DOCUMENTS

WO        2021032633 A1      2/2021

OTHER PUBLICATIONS

International Search Report and Written Opinion issued in corresponding PCT application No. PCT/US2022/077770, dated Apr. 25, 2023, 7 pages.

*Primary Examiner* — Jamie L McGowan
(74) *Attorney, Agent, or Firm* — Rutan & Tucker LLP; Hani Z. Sayed

(57)        ABSTRACT

An apparatus and methods are provided for transplanting slips with an automated slip transplanter. The transplanter comprises a planter unit, a singulation unit, a conveyor belt, a node sensor, and a controller. The planter unit is configured to plant consistent rows of evenly spaced slips in a field. The singulation unit comprises automated grippers and slip cartridges, and is configured to continuously singulate harvested slips stored in the slip cartridges. The conveyor belt is configured to receive the singulated slips from the automated grippers with brushed holders, and transfer the received slips on a belt to the planter unit. The node sensor is configured to autonomously collect performance data of the singulated slips in real-time. The controller is communicatively coupled to the node sensor, and configured to implement operational modes and dynamically adjust a planting slip rate based on the operational modes and performance data collected by the node sensor.

20 Claims, 14 Drawing Sheets

(56)  References Cited

U.S. PATENT DOCUMENTS

| | | | | |
|---|---|---|---|---|
| 5,655,467 | A  * | 8/1997 | Yasuda | A01C 11/006 |
| | | | | 111/105 |
| 7,316,189 | B2 * | 1/2008 | Fountain | A01C 11/025 |
| | | | | 47/1.01 R |
| 9,661,800 | B2 | 5/2017 | Buell et al. | |
| 11,263,707 | B2 * | 3/2022 | Perry | A01B 79/005 |
| 2006/0260522 | A1 * | 11/2006 | Fountain | A01C 11/025 |
| | | | | 111/105 |
| 2018/0153084 | A1 * | 6/2018 | Calleija | A01B 79/005 |
| 2018/0192579 | A1 * | 7/2018 | Dong | A01C 11/02 |
| 2019/0045706 | A1 * | 2/2019 | Kafri | A01C 11/025 |
| 2020/0390019 | A1 | 12/2020 | Wu et al. | |
| 2021/0392808 | A1 * | 12/2021 | Adam | A01B 79/005 |
| 2022/0217899 | A1 * | 7/2022 | Hasoon | A01C 11/006 |

* cited by examiner

ACTIVE NODE CONTROL PLANTING MODE

PRIORITY

This application claims the benefit of and priority to U.S. Provisional Application, entitled "Active Node Control Planting Mode," filed on Oct. 7, 2021 and having application Ser. No. 63/253,313, the entirety of said application being incorporated herein by reference.

FIELD

Embodiments of the present disclosure generally relate to transplanting machines. More specifically, the embodiments of the disclosure relate to apparatuses, systems, and methods for an automated slip transplanter having one or more operational modes that may enable an active depth control planting mode and an active node control planting mode.

BACKGROUND

As increasing demand for produce continues to upsurge, agricultural industries strive to mitigate demand issues by bringing automation to many decades-old harvesting issues, such as increased labor scarcity, rising costs, and so on. One example of these issues is transplanters (e.g., slip transplanters), which generally require: (i) improved transplanting speeds and qualities, (ii) reduced labor expenses including reduced operator hours, and (iii) increased robustness and reliability for the lifetime of the transplanting machine. Furthermore, a typical transplanting season occurs over 10 weeks, requiring hundreds of laborers and operators to keep up with a pace of approximately 500,000 slips/hour during the limited windows of cooperative weather. To further complicate these issues, planting season typically occurs once a year—and it does not always occur as expected.

For example, sweet potatoes have a unique lifecycle, one that has prohibited automation until recent developments. The main issue with the sweet potato involves the "slip" that is approximately one foot long, known as a highly variable plant stem harvested from mother bed potatoes, and individually transplanted into growing fields at the start of each season. Traditionally, only human hands have been capable of gently manipulating individual slips—without tearing their leaves and/or tangling multiple slips—and then inserting the individual slips into the ground.

In addition, typical planting depths for agricultural crops, such as sweet potato slips, may vary based on weather, topography, irregular harvesting season, and so on. Generally, one of the transplanter's objectives is to place the slips into the well-drained, warm soil at a consistent depth to achieve uniform emergence. That is, germination and emergence may be optimized when the planting depth is controlled, consistent, and manually adjusted for planting in optimal soil properties. During, for example, maintenance operations of the transplanter, one or more adjustments of the actuator and other depth controlling components may be required to achieve the desired planting depth. Unfortunately, such adjustments to the transplanter are usually performed manually, and thus these manual adjustments are likely prone to human error and inconsistencies, which may then require more considerable resources, maintenance, and time.

Accordingly, there is a need for an automated transplanter capable of taking bulk stored harvested slips from a minimal operating crew and outputting a consistent planted row of evenly spaced transplanted slips to thereby improve various operational processes, such as labor costs, yield opportunities, and field utilization. In addition, there is a need for an automated transplanter capable of having multiple operational modes and actively controlling planting slip rates as well as planting depths, angles, and node counts to thereby achieve improved automation, increased production efficiency, and reduced high labor costs and operator hours.

SUMMARY

An apparatus and methods are provided for transplanting slips with an automated slip transplanter. The transplanter comprises a planter unit, a singulation unit, a conveyor belt, a node sensor, and a controller. The planter unit is configured to plant consistent rows of evenly spaced slips in a field. The singulation unit comprises automated grippers and slip cartridges, and is configured to continuously singulate harvested slips stored in the slip cartridges. The conveyor belt is configured to receive the singulated slips from the automated grippers with brushed holders, and transfer the received slips on a belt to the planter unit. The node sensor is configured to autonomously collect performance data of the singulated slips in real-time. The controller is communicatively coupled to the node sensor, and configured to implement operational modes and dynamically adjust a planting slip rate based on the operational modes and performance data collected by the node sensor.

In an exemplary embodiment, an automated slip transplanter comprises: a planter unit configured to plant a consistent row of evenly spaced slips in a field; a singulation unit having a plurality of automated grippers and a plurality of slip cartridges, the singulation unit configured to continuously singulate harvested slips that are stored in the plurality of slip cartridges; a conveyor belt having a belt and a plurality of brushed holders, the plurality of brushed holders pivotally disposed on the belt, wherein the plurality of brushed holders are configured to receive the singulated slips from the plurality of automated grippers, and the belt is configured to transfer the received slips to the planter unit; a node sensor associated with the planter unit, the singulation unit, and the conveyor belt, the node sensor configured to autonomously collect performance data of the singulated slips in real-time; and a controller communicatively coupled to the node sensor, the controller configured to implement one or more operational modes and dynamically adjust a planting slip rate based on the one or more operational modes and the performance data collected by the node sensor.

In another exemplary embodiment, the controller is configured to actively control at least one or more of the planter unit, the singulation unit, and the conveyor belt in order to dynamically adjust the planting slip rate. In another exemplary embodiment, the controller actively controls and dynamically adjusts the planting slip rate to maintain a predetermined overall planting slip rate. In another exemplary embodiment, the controller is configured to actively target a predetermined number of nodes per slip based on the predetermined overall planting slip rate and the performance data collected by the node sensor. In another exemplary embodiment, the planter unit comprises a sword assembly and an open rail assembly, wherein the conveyor belt is configured to sequentially transfer the received slips to an open rail track of the open rail assembly, and wherein the open rail track is configured to deliver the singulated slips to the sword assembly, such that the sword assembly thereby plants the consistent row of evenly spaced slips in the field.

In another exemplary embodiment, the performance data comprises at least one or more of a node count, a singulation rate, a population value, a number of skipped slips, a number of multiple slips, a slip spacing rate, and a belt speed. In another exemplary embodiment, the conveyor belt is operably coupled to the singulation unit and the planter unit, wherein the singulation unit is vertically disposed on the planter unit, and wherein each of the plurality of automated grippers are configured to singularly grasp a harvested slip from one of the plurality of slip cartridges and discharge each of the singulated slips on the conveyor belt. In another exemplary embodiment, the singulation unit further comprises a buffer system, and wherein the buffer system is configured to implement slip rejection and buffering input operations to thereby facilitate the overall predetermined planting slip rate. In another exemplary embodiment, the one or more operational modes comprise an active depth control planting mode and an active node control planting mode. In another exemplary embodiment, the node sensor comprises a monitoring device configured to implement a planting slip-rate prediction neural network.

In an exemplary embodiment, a transplanting system comprises: an articulator supported by one or more drive wheels; an automated slip transplanter mounted to the articulator, wherein the automated slip transplanter has a first hitch that is pivotally hitched to a second hitch of the articular; and a plurality of harvested slips disposed in a plurality of slip cartridges, the plurality of slip cartridges arranged in one or more rows of slip cartridges that are stacked in a main body frame of the automated slip transplanter, wherein the main body frame comprises a top body frame vertically disposed over a bottom body frame; wherein the automated slip transplanter further comprises: a planter unit configured to plant a plurality of consistent row of evenly spaced slips in a field; a singulation unit having a plurality of automated grippers and a plurality of slip cartridges, the singulation unit configured to continuously singulate harvested slips that are stored in the plurality of slip cartridges; a conveyor belt having a belt and a plurality of brushed holders, the plurality of brushed holders pivotally disposed on the belt, wherein the plurality of brushed holders are configured to receive the singulated slips from the plurality of automated grippers, and the belt is configured to transfer the received slips to the planter unit; a node sensor associated with the planter unit, the singulation unit, and the conveyor belt, the node sensor configured to autonomously collect performance data of the singulated slips in real-time; and a controller communicatively coupled to the node sensor, the controller configured to implement one or more operational modes and dynamically adjust a planting slip rate based on the one or more operational modes and the performance data collected by the node sensor.

In another exemplary embodiment, the controller is configured to actively control at least one or more of the planter unit, the singulation unit, and the conveyor belt in order to dynamically adjust the planting slip rate. In another exemplary embodiment, the controller actively controls and dynamically adjusts the planting slip rate to maintain a predetermined overall planting slip rate. In another exemplary embodiment, the controller is configured to actively target a predetermined number of nodes per slip based on the predetermined overall planting slip rate and the performance data collected by the node sensor. In another exemplary embodiment, the planter unit comprises a sword assembly and an open rail assembly, wherein the conveyor belt is configured to sequentially transfer the received slips to an open rail track of the open rail assembly, and wherein the open rail track is configured to deliver the singulated slips to the sword assembly, such that the sword assembly thereby plants the consistent row of evenly spaced slips in the field.

In another exemplary embodiment, the performance data comprises at least one or more of a node count, a singulation rate, a population value, a number of skipped slips, a number of multiple slips, a slip spacing rate, and a belt speed. In another exemplary embodiment, the conveyor belt is operably coupled to the singulation unit and the planter unit, wherein the singulation unit is vertically disposed on the planter unit, and wherein each of the plurality of automated grippers are configured to singularly grasp a harvested slip from one of the plurality of slip cartridges and discharge each of the singulated slips onto the conveyor belt. In another exemplary embodiment, the singulation unit further comprises a buffer system, and wherein the buffer system is configured to implement slip rejection and buffering input operations to thereby facilitate the overall predetermined planting slip rate. In another exemplary embodiment, the one or more operational modes comprise an active depth control planting mode and an active node control planting mode, and wherein the node sensor comprises a monitoring device configured to implement a planting slip-rate prediction neural network.

In an exemplary embodiment, a method for transplanting harvested slips with an automated slip transplanter comprises: continuously singulating harvested slips from a plurality of slip cartridges in a singulation unit of automated slip transplanter, wherein the singulation unit comprises a plurality of automated grippers; transferring the singulated slips from the plurality of slip cartridges with the plurality of automated grippers and discharging the singulated slips on a conveyor belt, wherein the conveyor belt comprises a plurality of brushed holders pivotally disposed on a belt; receiving the singulated slips with the plurality of brushed holders and transferring the received slips on the belt to a planter unit of the automated slip transplanter; autonomously collecting performance data of the singulated slips in real-time with a node sensor, wherein the node sensor is associated with the planter unit, the singulation unit, and the conveyor belt; dynamically adjusting a planting slip rate with a controller that is communicatively coupled to the node sensor, the controller is configured to implement one or more operational modes, wherein the planting slip rate is dynamically adjusted by the controller based on the one or more operations modes and the performance data collected by the node sensor; and planting a plurality of consistent rows of evenly spaced slips in a field with the planter unit of the automated slip transplanter based on the planting slip rate.

These and other features of the concepts provided herein may be better understood with reference to the drawings, description, and appended claims.

BRIEF DESCRIPTION OF THE DRAWINGS

The drawings refer to embodiments of the present disclosure in which.

5

6

Figure 5:
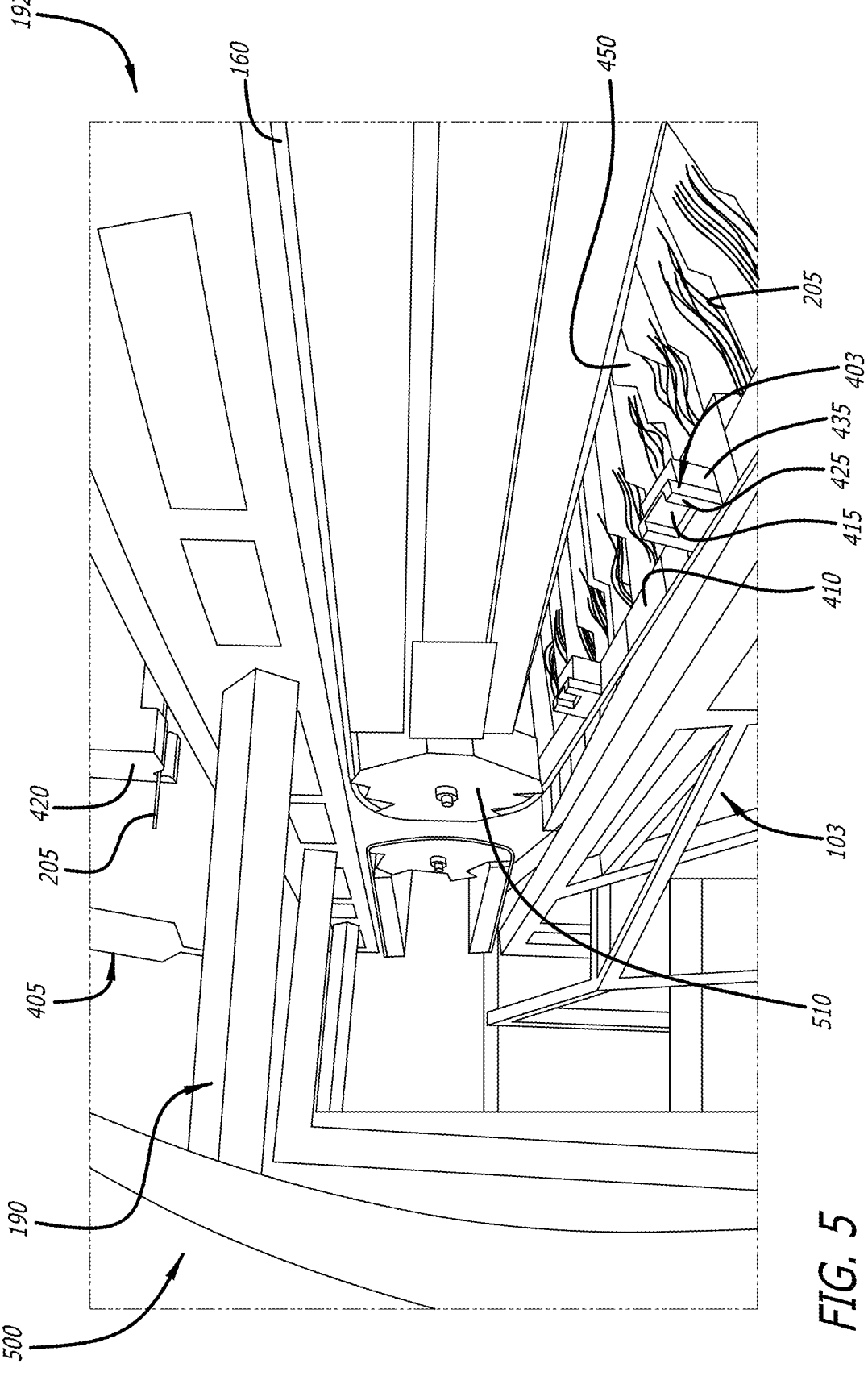
Figure 6:
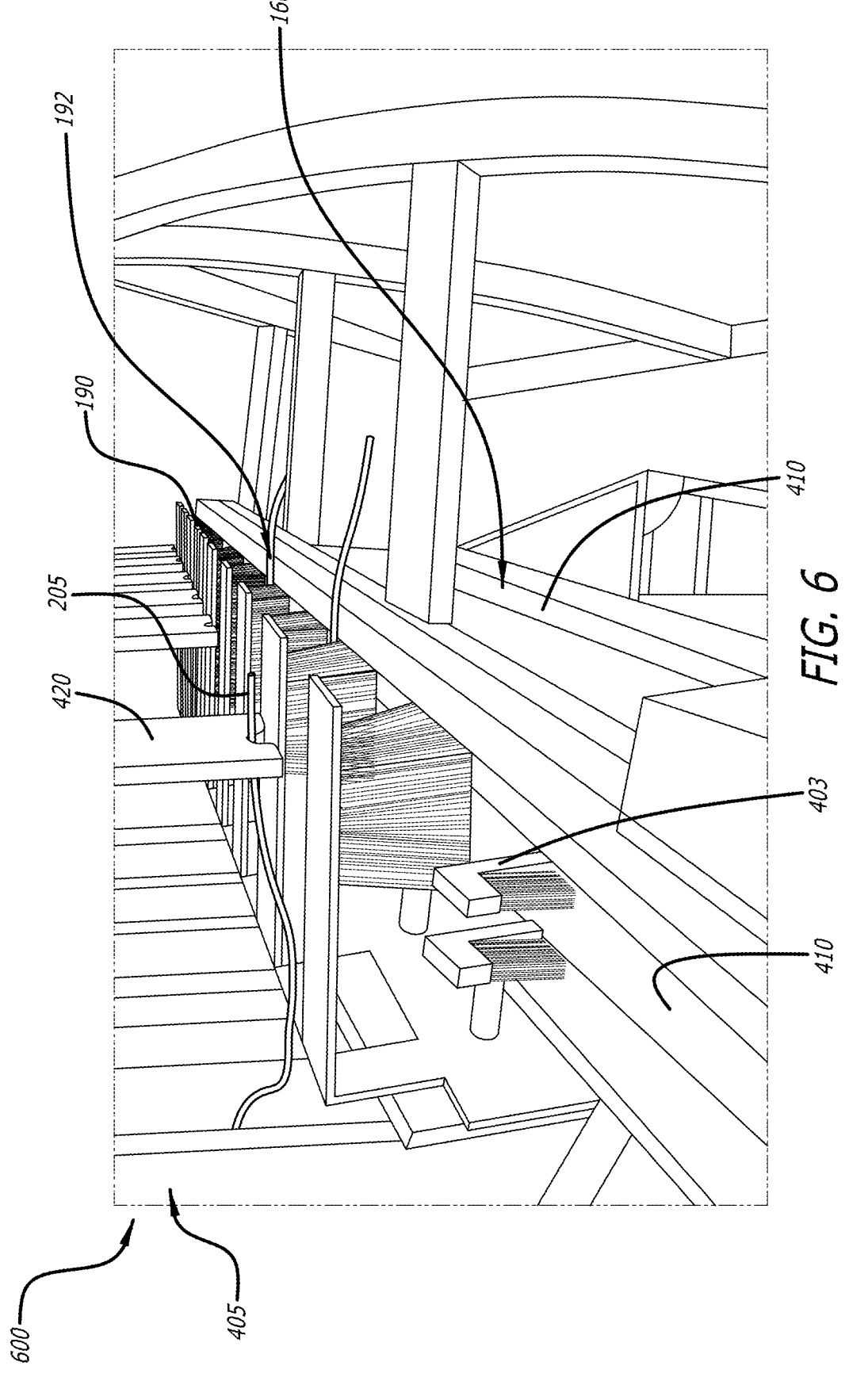
Figure 7:
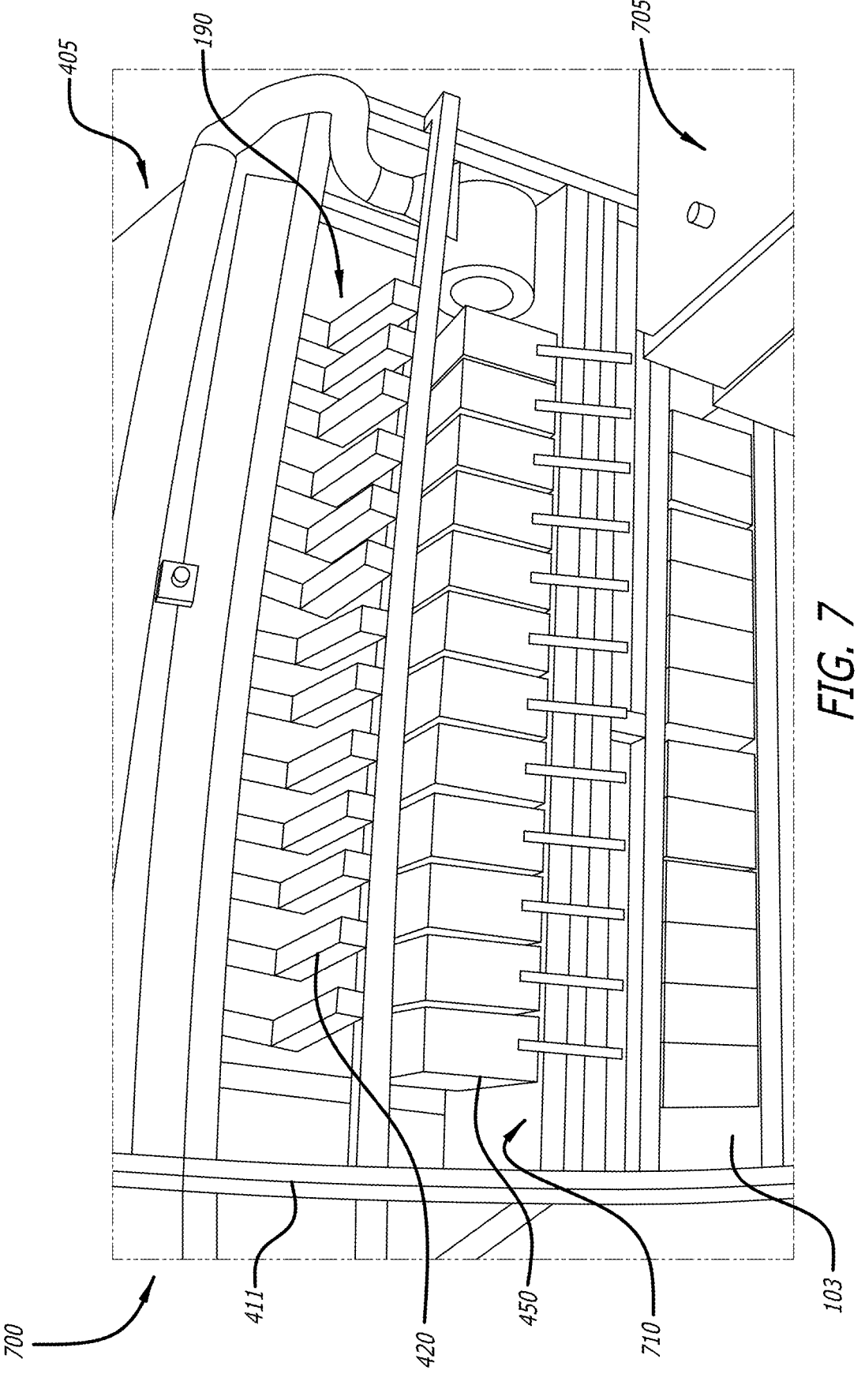
Figure 8A:
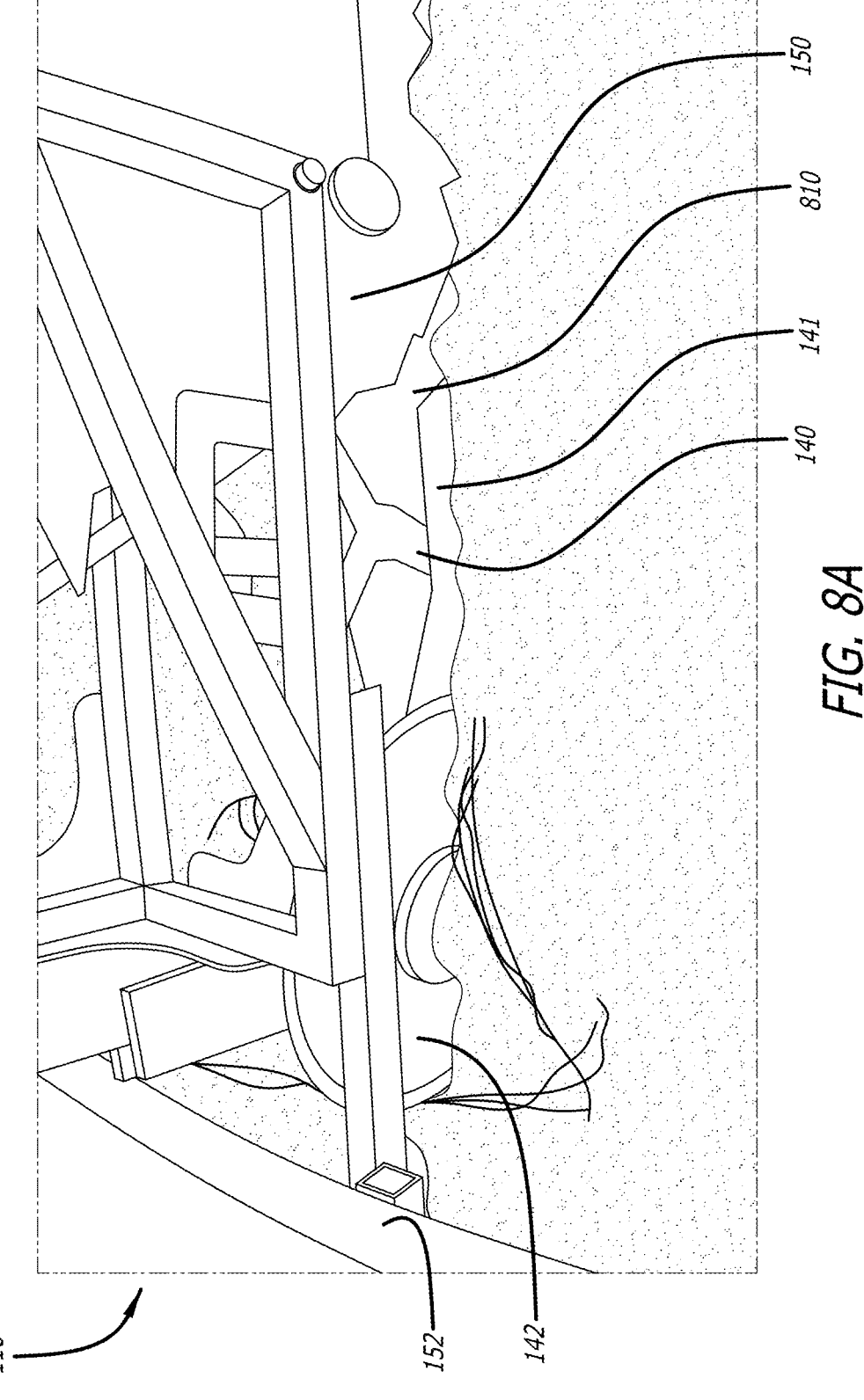
Figure 8B:
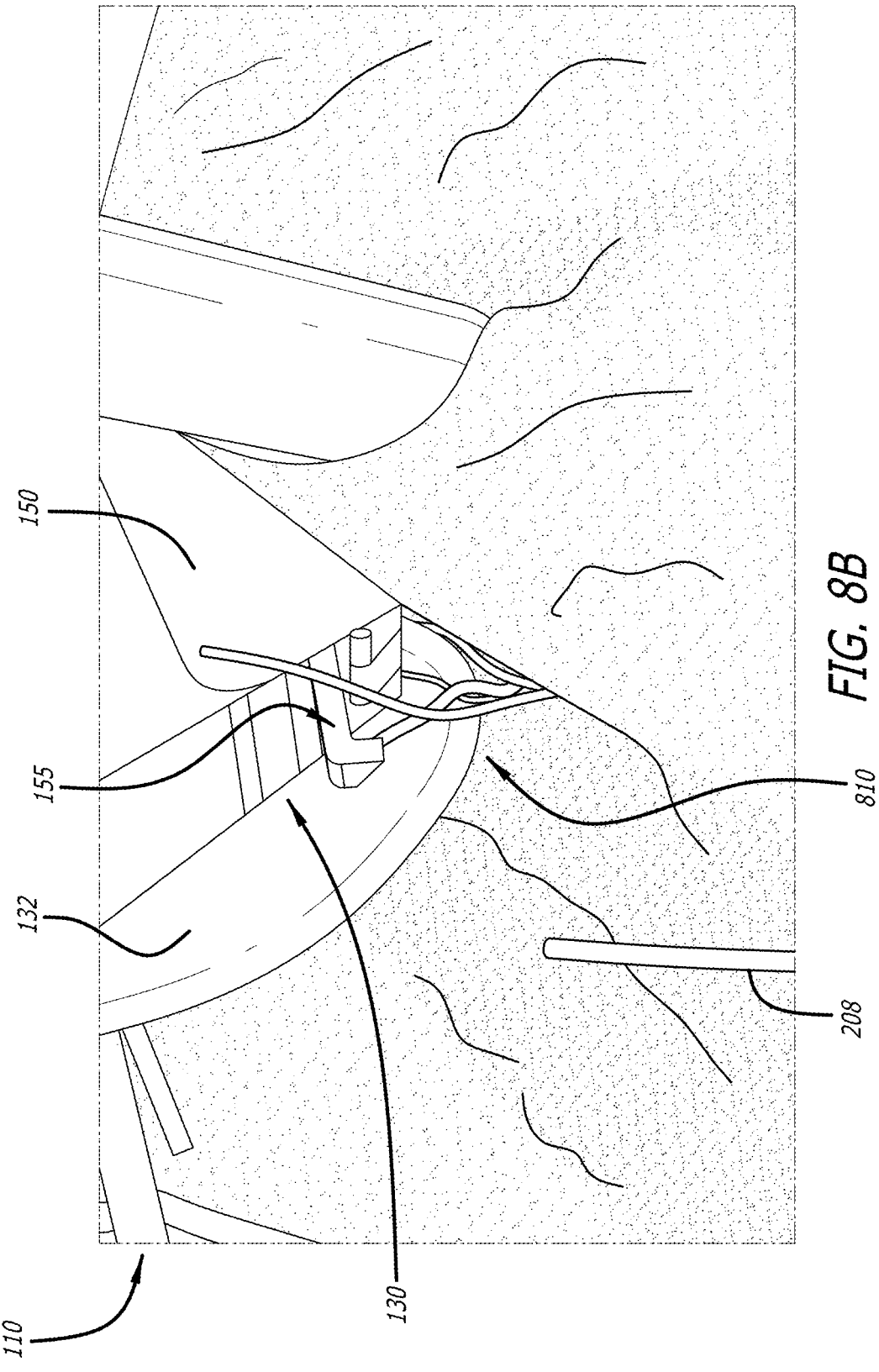
Figure 9:
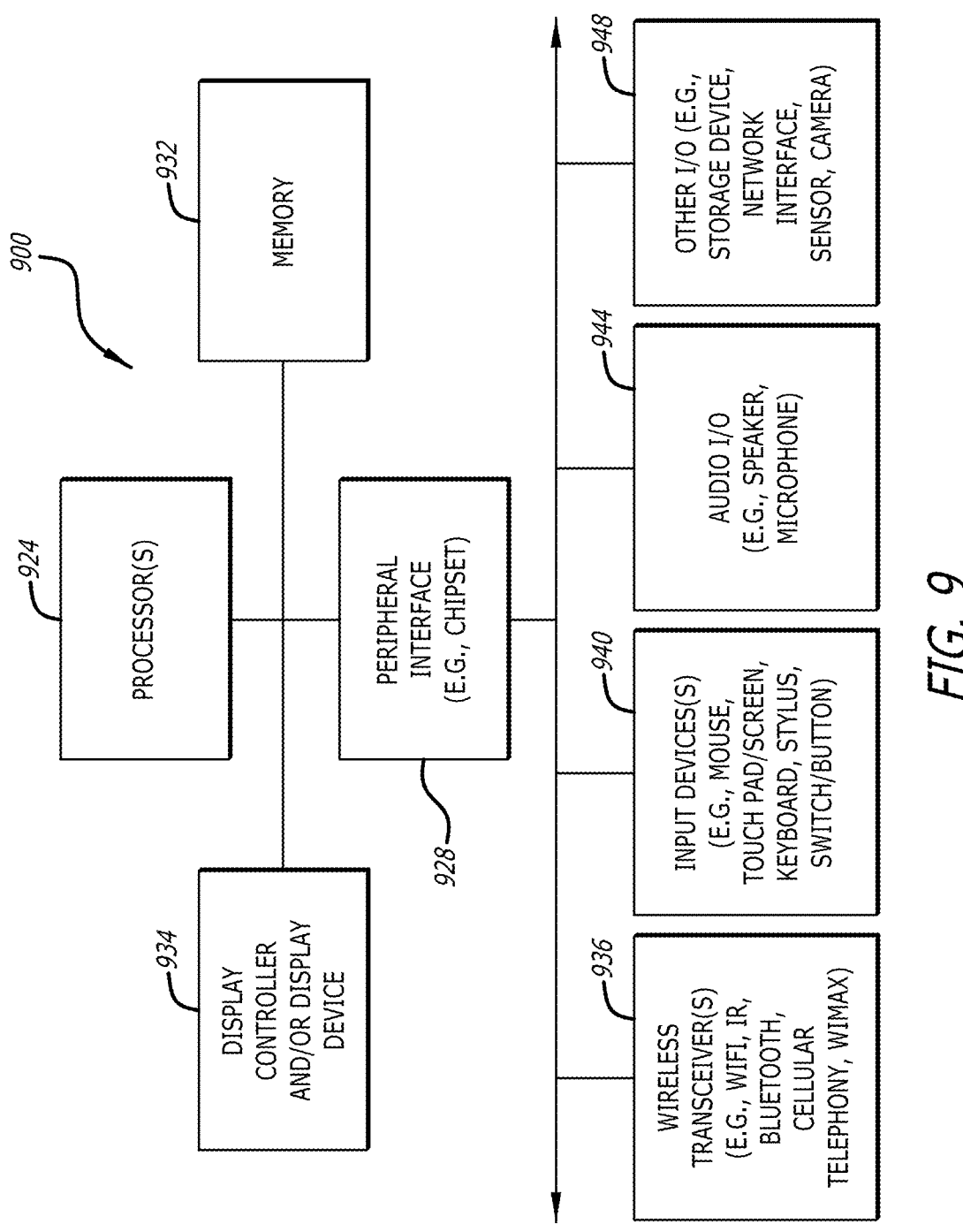

FIGS. 3A-3D illustrate a series of plan views of an automated transplanter having one or more operations modes, in accordance with some embodiments of the present disclosure;

FIGS. 4A-4D illustrate a series of perspective views of an automated transplanter having a singulation unit with automated grippers and slip cartridges, and a conveyer belt with brushed slip holders, in accordance with some embodiments of the present disclosure;

FIG. 5 illustrates a perspective view of a buffer assembly of an automated transplanter, in accordance with an embodiment of the present disclosure;

FIG. 6 illustrates a perspective view of an upper belt assembly of an automated transplanter, in accordance with an embodiment of the present disclosure;

FIG. 7 illustrates a perspective view of an automated transplanter having a chassis disposed with one or more slip cartridges, automated claws, and slips, in accordance with an embodiment of the present disclosure;

FIG. 8A illustrates a perspective view of a sword assembly of an automated transplanter, in accordance with an embodiment of the present disclosure;

FIG. 8B illustrates a perspective view of a closing wheel assembly of an automated transplanter, in accordance with an embodiment of the present disclosure; and FIG. 9 illustrates is a block diagram of an exemplary data processing system that may be used with one or more embodiments of an automated transplanter having one or more operational modes in accordance with the present disclosure.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as a "first operational mode," may be made. However, the specific numeric reference should not be interpreted as a literal sequential order but rather interpreted that the "first operational mode" is different than a "second operational mode." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

As the ever-increasing demand for produce continues to upsurge, agricultural industries drive to mitigate demand issues by bringing automation to many decades-old harvesting issues, such as increased labor scarcity, rising costs, and so on. One example of these issues is transplanters (e.g., slip transplanters), which generally require: (i) improved transplanting speeds and qualities, (ii) reduced labor expenses including reduced operator hours, and (iii) increased robustness and reliability for the lifetime of the transplanting machine. Furthermore, a typical transplanting season occurs over 10 weeks, requiring hundreds of laborers and operators to keep up with the pace of approximately 500,000 slips/hour during the limited windows of cooperative weather. To further complicate these issues, planting season typically occurs once a year—and it does not always occur as expected.

For example, sweet potatoes have a unique lifecycle, one that has prohibited automation until recent developments. The main issue with the sweet potato involves the "slip" that is approximately one foot long, known as a highly variable plant stem harvested from the mother bed potatoes, and individually transplanted into the growing fields at the start of each season. Traditionally, only human hands have been capable of gently manipulating individual slips—without tearing their leaves and/or tangling multiple slip—and then inserting the individual slips into the ground.

In addition, typical planting depths for agricultural crops, such as sweet potato slips, may vary based on weather, topography, irregular harvesting season, and so on. Generally, one of the transplanter's objectives is to place the slips into the well-drained, warm soil at a consistent depth to achieve uniform emergence. That is, germination and emergence may be optimized when the planting depth is controlled, consistent, and manually adjusted for planting in optimal soil properties. During, for example, maintenance operations of the transplanter, one or more adjustments of the actuator and other depth controlling components may be required to achieve the desired planting depth. Unfortunately, such adjustments to the transplanter are usually performed manually, and thus these manual adjustments are likely prone to human error and inconsistencies, which may then require more considerable resources, maintenance, and time.

Also, as noted above, moisture and temperature vary spatially within fields and within the top three inches of the soil due to soil texture, topography, geography, crop usage, irrigation patterns, residue cover, and a variety of other agricultural factors. As such, many growers and transplanters must occasionally compromise one factor for another, such as planting shallower/deeper into warmer/colder soil than desirable. Accordingly, there is a need for an automated transplanter capable of taking bulk stored harvested slips from a minimal operating crew and outputting a consistently planted row of evenly spaced transplanted slips to thereby improve various operational processes, such as labor costs, yield opportunities, and field utilization. In addition, there is a need for an automated transplanter capable of having multiple operational modes and actively controlling planting depths, angles, node counts, and slip rates to thereby achieve improved automation, increased production efficiency, and reduced high labor costs and operator hours.

Embodiments disclosed herein provide one or more apparatuses, systems, and methods for autonomously transplanting slips with an automated slip transplanter. Furthermore, several embodiments disclosed herein provide methods for actively controlling a depth planting mode of the automated slip transplanter to dynamically adjust a planting depth in real-time, and for actively controlling a node planting mode of the automated slip transplanter to dynamically target a predetermined number of nodes per slip for maximal plant yield implementation.

In most embodiments, the automated slip transplanter may comprise a planter unit, a singulation unit, a conveyor belt, and/or a controller. In some embodiments, the planter unit may be implemented as a floating frame assembly that includes a floating frame, a sword assembly, an open rail assembly, and a closing wheels assembly. For example, the planter unit may be supported by one or more wheels of the closing wheels assembly. In some embodiments, the singulation unit may include one or more singulation mechanisms, such as automated grippers configured to singularly grasp slips from multiple slip cartridges and discharge (or release) the singulated slips to the conveyor belt that is operably coupled to the singulation unit and planter unit.

The conveyor belt may have a belt with brushed holders configured to receive the singulated slips and then to transfer (or convey) them consistently towards the planter unit. Furthermore, in many embodiments, the automated slip transplanter may use the controller to actively control the planter unit based on one or more operational modes (e.g., an active depth control planting mode, an active node control planting mode, etc.) for planting consistent rows of evenly spaced slips in the ground. As such, the controller may be configured to implement one or more of the operational modes to dynamically adjust (or vary) planting slip rates as well as planting depths, planting angles, and/or planting node counts.

For example, as described below in greater detail, the transplanter may include a node sensor (e.g., a sensor capable of implementing neural network processes) that is associated with the planter unit, the singulation unit, and the conveyor belt, the node sensor configured to autonomously collect performance data of the singulated slips in real-time. Furthermore, in these embodiments, the node sensor may be communicatively coupled to the controller, such that the controller may be capable of dynamically adjusting a planting slip rate based on the one or more operational modes (e.g., the active node control planting mode) and the performance data collected by the node sensor. For example, the controller may be configured to actively control at least one or more of the planter unit, the singulation unit, and the conveyor belt in order to dynamically adjust the planting slip rate, where the controller may actively control and dynamically adjust the planting slip rate to thereby maintain a predetermined overall planting slip rate.

Lastly, as discussed in the embodiments below, the controller may be configured to actively target a predetermined number of nodes per slip based on the predetermined overall planting slip rate and the performance data collected by the node sensor. In several embodiments, the node sensor may be configured to monitor and collect any number and types of performance data points including, but not limited to, a node count, a singulation rate, a population value, a number of skipped slips, a number of multiple slips, a slip spacing rate, and a belt speed. For example, as used herein, the "planting slip rate" may refer to the number of slips (or plants) that may need to reach maturity to maximize yield. Whereas, as used herein, the population value (or the slip/plant population) may refer to the number of slips/plants that have been planted per acre. As such, the "planting slip rate" may ultimately refer to the number of slips (or nodes per slip) planted per acre in order to attain the overall desired (or predetermined) plant population value.

Figure 1:
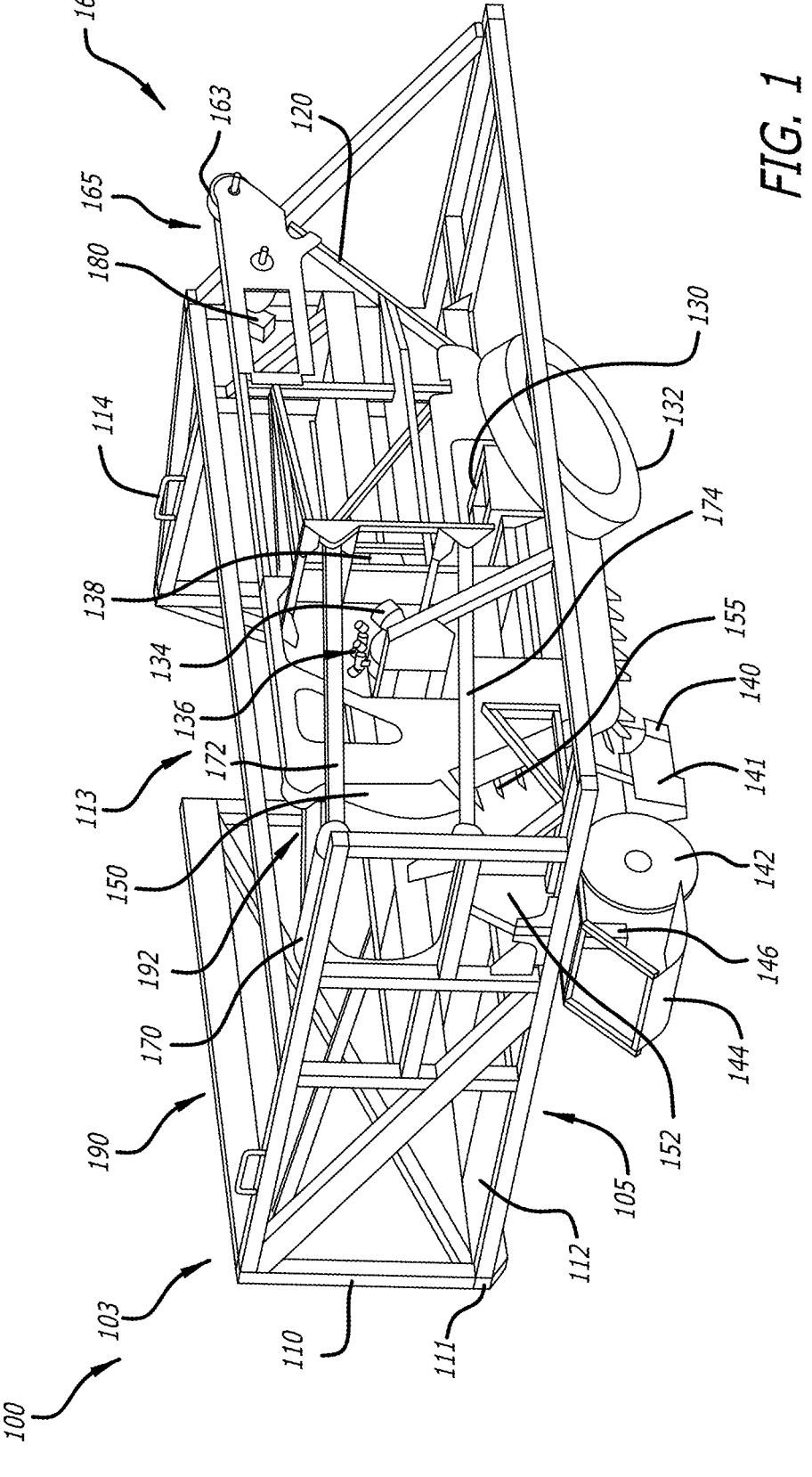
FIG. 1 illustrates an isometric view of an exemplary embodiment of an automated transplanting system with an automated transplanter having one or more operations modes, in accordance with an embodiment of the present disclosure.

Referring now to FIG. 1, an isometric view illustration of a transplanting system 100 is shown, in accordance with embodiments of the disclosure. In these embodiments, as shown in FIG. 1, the transplanting system 100 may be implemented as a slip transplanting system comprising, but not limited to, an articulator 105 (e.g., a tractor) and an automated slip transplanter 103 (hereinafter, may be referred to as the "transplanter"). It should be understood that the automated slip transplanter 103 is capable of transplanting sweet potato slips, however it is not limited to only sweet potato slips and may be configured to transplant any other planting node/slip if desired, without limitations. In most embodiments, the transplanting system 100 may include the transplanter 103 mounted to the articulator 105, where the articulator 105 may be supported by one or more drive wheels (not shown). In an embodiment, the transplanter 103 may have a hitch (or a first hitch) pivotally hitched to a hitch (or a second hitch) of the articular 105, where the hitches (not shown) may be a point hitch, a tongue, and/or any similar hitching/towing mechanism. Additionally, in some embodiments, the articulator 105 may tow the transplanter 103 around a field and provide power to the transplanter 103 (e.g., via a power take off ("PTO")) for powering the operations of the transplanter 103).

As described herein, the embodiments of the transplanter 103 may be used for an automated slip transplanter (or mostly/semi-automated transplanter), which may be implemented to: (i) actively manage a depth planting mode capable of dynamically adjusting a planting depth in real-time, (ii) actively manage a node planting mode capable of dynamically and autonomously targeting a predetermined number of nodes per slip, and/or (iii) actively control/manage a buffering mode capable of facilitating slip rejection and buffering input. As such, the transplanter 103 may thereby be used to substantially improve existing transplanting systems, machines, and/or processes by ensuring maximum field utilization, optimal per slip (or plant) yield implementation, and substantial cost-effective techniques, such that, for example, the labor costs and operator hours are significantly reduced.

Furthermore, in accordance with most embodiments, the transplanter 103 may be used to take bulk stored harvested slips from a minimal operating crew and output one or more consistent planted rows of evenly spaced transplanted slips. For example, the transplanter 103 may be configured to plant any desired number of rows including, but not limited to, one row, two rows, four rows, and/or eight rows. Furthermore, in accordance with several other embodiments, the transplanter 103 may be configured to autonomously carry out one or more operational modes in real-time to actively control and adjust a planting depth, a planting angle, a targeted node count, a planting slip rate, and/or any other desired transplanting configuration. That is, in several embodiments, the operational modes implemented by the transplanter 103 may include, but are not limited to, an active depth control planting mode, an active node control planting mode, a slip rejection/buffering mode, and so on.

As illustrated in FIG. 1, the transplanter 103 may comprise, but is not limited to, a planter unit/assembly 110, a singulation unit/assembly 190, a conveyor belt unit/assembly 160, a node sensor 192 (e.g., a sensor capable of implementing a neural network and/or the like), and one or more controllers 136 (or controller devices, lines, etc.) (e.g., as shown with the controller 405 of the singulation unit 190 depicted in FIGS. 4A-4C, and the main controller 705 depicted in FIG. 7). It should be understood that one or more of these units/assemblies 110, 190, 160, 193,136 may be better illustrated in greater detail in the following Figures depicted below. In addition, although FIG. 1 depicts one specific view, illustration, and assembled configuration of the various components and subassemblies of the transplanter 103, it should be appreciated that more or less mechanisms may be used, that one or more mechanisms may be positioned differently (or in different locations), that one or more assemblies/sub-assemblies may be assembled differently and using more or less mechanisms, and that one or more mechanism, assemblies, and/or sub-assemblies may be assembled using different techniques, sizes, etc., without limitations.

The transplanter 103 may have the singulation unit 190 operably coupled to the planter unit 110, where the singulation unit 190 may be disposed on or over the planter unit 110. In some embodiments, the singulation unit 190 may include one or more singulation mechanisms that are depicted below in FIGS. 4A-4D and 5-7, such as automated grippers (or robotic arms, fingers, etc.) configured to singularly grasp slips from multiple slip cartridges and discharge/release them onto the conveyor belt 160. Furthermore, as shown below in FIGS. 4C and 5-6, the conveyor belt 160 may be operably coupled to the singulation unit 190 and the planter unit 110. For example, the conveyor belt 160 may have a continuous belt with multiple hinged brushed slip holders (e.g., as shown with the belt holder assembly 403 depicted in FIG. 4D, which includes the belt 410 and the other brushed slip holder mechanisms 415, 425, 435, 445), where the brushed slip holders may be configured to receive the singulated slips and then transfer/convey them down towards the planter unit 110. Note that, as noted above, it should be understood that the singulation unit 190, the conveyor belt 160, and the one or more controllers may be described in greater detail below.

Continuing with the illustration of FIG. 1, the planter unit 110 may be configured as a floating frame assembly that includes, but is not limited to, a side rail frame 111, a floating frame 120, a closing wheels assembly 130, a drive actuator assembly (or active suspension assembly) 134, a suspension assembly (or shock and spring assembly) 138, a sword assembly 140, an open rail assembly 150, a drive timing pully assembly 163 with a timing pully belt 165, and a drive motor 180. In some embodiments, the side rail frame 111 may be implemented as a bottom body frame/chassis of the transplanter 103 that may be rigid/robust and has an extended lifecycle.

As shown in FIG. 1, the illustrated side rail frame 111 may surround/house the floating frame 120 and be pivotally coupled to and supported (or maneuvered) by the closing wheels 132 of the closing wheels assembly 130. According to several embodiments, the side rail frame 111 may be coupled to the floating frame 120 via a four-bar mount plate 170, two upper linkage bars 172, and two lower linkage bars 174. In some embodiments, the side rail frame 111 may be configured with a platform 112, an opening 113 for the platform 112, and a pair of handles 114, where the platform 112 may support an operator (if desired) and/or store bulk harvested slips, slip cartridges, and so on.

Figures 4A, 4B:
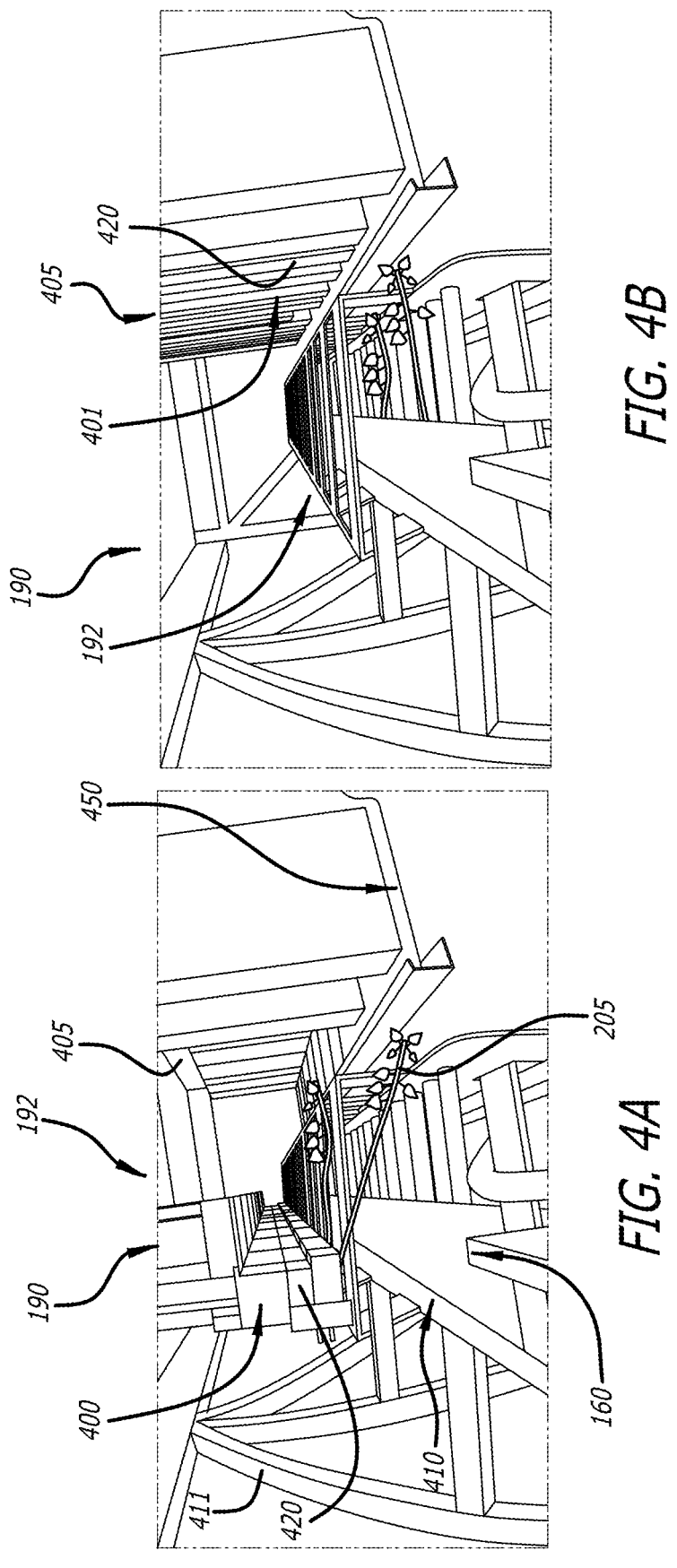

For example, the side rail frame 111, the floating frame 120, and any other frames of the transplanter 103 (e.g., the top body frame/chassis 411 of the singulation unit 190 depicted in FIG. 4A) may be composed of a metallic material (e.g., aluminum, titanium, or stainless steel, brass, copper, chromoly steel, iron, and/or the like), a composite material (e.g., carbon fiber), a polymeric material (e.g., plastic), and/or some combination of these materials (or any other similar materials). That is, the frames of the transplanter 103 may need to be formed with a substantially rigid material that may support stress applied at/near any of the frame's joints/nodes, and also support compression, tension, torsion, shear stresses, and/or some type of combination of these stress types.

In addition, the planter unit 110 may be configured with the sword assembly 140 comprising of, but not limited to, a furrow sword opener 141, a sword 142 (or sword disk, furrow disk, etc.), a dirt flap 144, and a sensor 146; and the open rail assembly 150 comprising of, but not limited to, an open rail sway guard/slip panel/support bracket 152 and an open rail track 155. As shown, in several embodiments, the planter unit 110 may be supported by one or more wheels 132 of the closing wheels assembly 130 and/or the sword 142 of the sword assembly 140.

Furthermore, as distinctly shown below in FIGS. 2A-2B and 8A-8B, the transplanter 103 may use the planter unit 110 to receive the bulk stored harvested slips from a minimal operating crew (if desired), and then autonomously output a consistent planted row of evenly spaced transplanted slips (e.g., as shown with the transplanted slip 205 of FIGS. 2A-2B). In several embodiments, as discussed above, the planter unit 110 may be managed/controlled with one or more controllers, which may include, but is not limited to, the depth controller 136 in conjunction with the sensor 146. That is, the transplanter 103 may use the controller 136 (or any other controller) to actively control the planter unit 110 based on one or more operational modes such as an active depth control planting mode, an active node control planting mode, and so on.

For example, the controller 136 in conjunction with the sensor 146 may be configured to implement one or more of the operational modes to dynamically adjust planting depths, planting angles, planting node counts, and/or planting slip rates. In some embodiments, the sensor 146 may be arranged directly in front of the sword 142 and disposed between the dirt flap 146 and the sword 142. As such, this configuration may facilitate the active depth control planting mode for the transplanter 103, which may then be used to dynamically adjust the planting depth of the planting unit 110 in real-time, such that the sword 142, the furrow sword opener 141, and/or the closing wheels 132 may be dynamically adjusted higher and/or lower into the soil with respect to the z-axis.

For example, the sensor 146 may be configured to provide a signal to the controller 136 based on at least an angle of rotation in relation to the ground and the planter unit 110. In another example, the controller 136 may be configured to implement the active depth control planning mode to dynamically adjust the planting depth based on one or more planting measurements (or data points) collected by the sensor 146. Furthermore, the controller 136 may be configured to actively adjust a depth of operation of the planter unit 110 based on any of the planting measurements collected by the sensor 146, where the depth of operation may include adjusting all (or most) of the mechanisms of the planter unit 110 in order to achieve a newly desired planting depth/angle.

In some embodiments, the sensor 146 may include, but is not limited to, a depth sensor, a motion sensor, a photoelectric sensor, an optical encoder, a rotary sensor, a linear potentiometer sensor, and/or any other similar depth sensing device. Furthermore, as described above, the sensor 146 may be configured to measure one or more soil properties and collect one or more planting measurements in real-time as the planter unit 110 traverses the ground/field. For example, the sensor 146 may be configured to collect the measurement data with regard to the soil properties and/or the collected planting measurements, where the collected planting measurements may further include, but are not limited to, soil reflectance measurements, predetermined planting properties of the transplanted slips, and/or variable depth measurements between the ground and the planter unit 110 (or between the ground and any components of the transplanter 103).

Additionally, as shown in FIG. 1, the transplanter 103 may include the node sensor 192 that may be associated with one or more of the planter unit 110, the singulation unit 190, and the conveyor belt 160. In most embodiments, the node sensor 192 may be configured to autonomously monitor the singulated slips as they are transferred throughout the transplanter 103, and also to collect performance data of the singulated slips in real-time. Furthermore, in many embodiments, the node sensor 192 may be communicatively coupled to a controller (e.g., the controller 136 and/or any other controllers described herein), where the controller may be configured to implement one of the operational modes (e.g., the active node control planting mode) and to dynamically adjust a planting slip rate based on the implemented operational mode and the performance data collected by the node sensor 192. Note that the node sensor 192 is described in greater detail below.

Figure 2B:
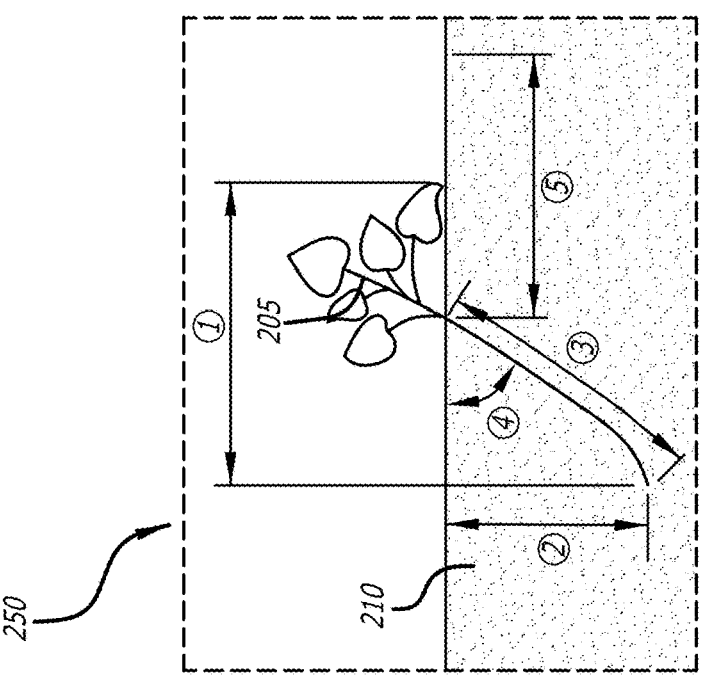
FIGS. 2A-2B illustrate a series of cross-sectional views of a slip transplanted with an automated transplanter using an active depth control planting mode, in accordance with some embodiments of the present disclosure.
Figure 2A:
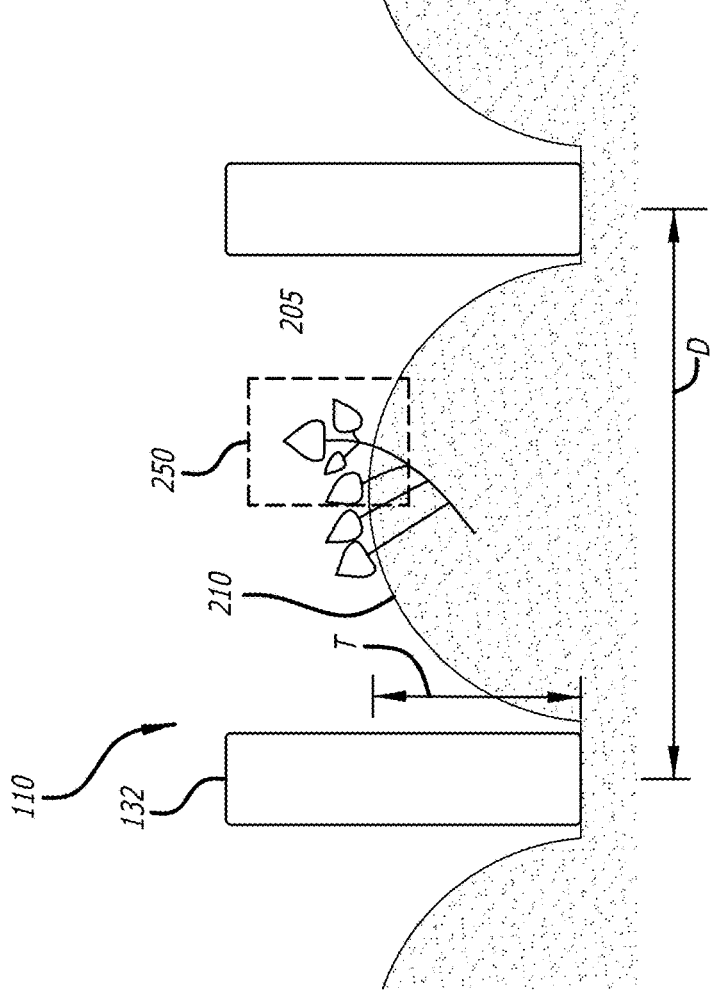
Figure 3A:
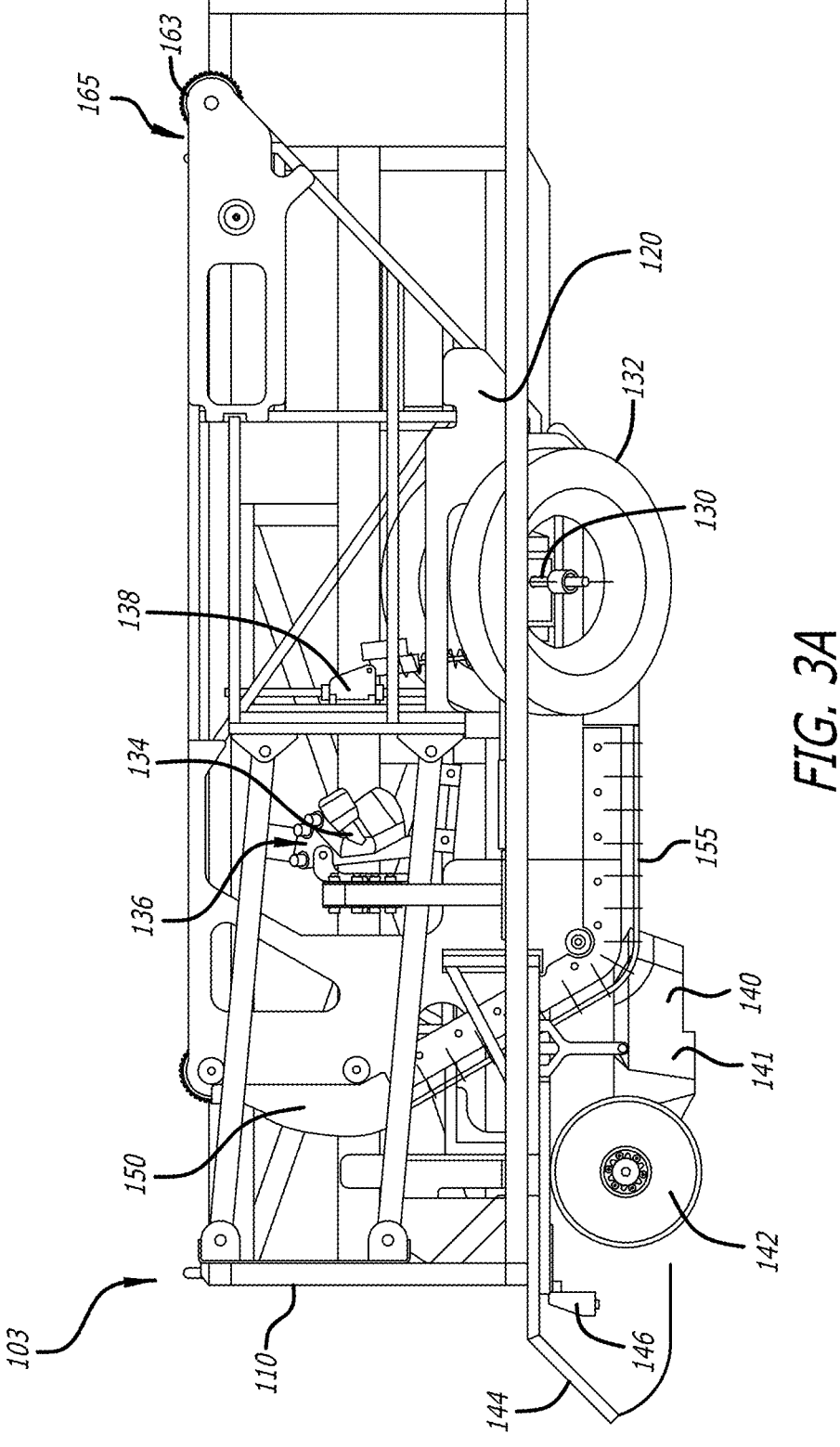
Figures 3B, 3C:
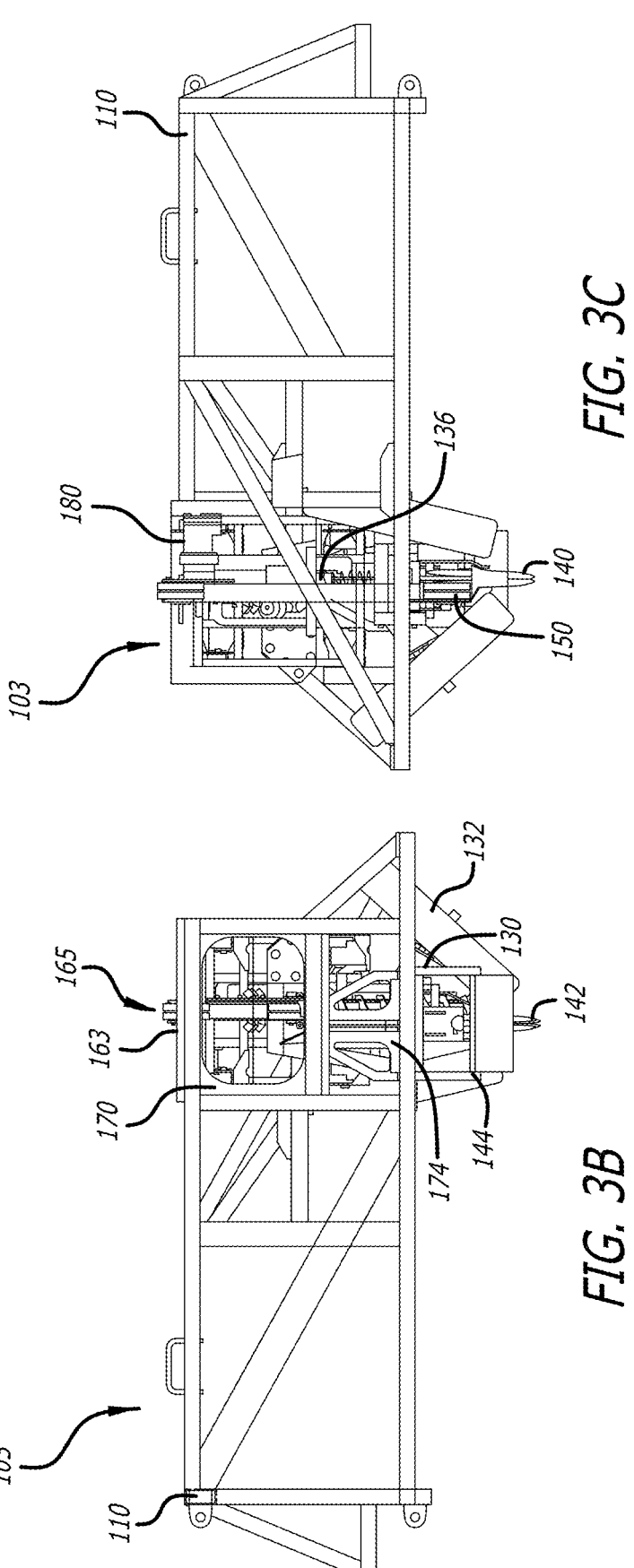
Figure 3D:
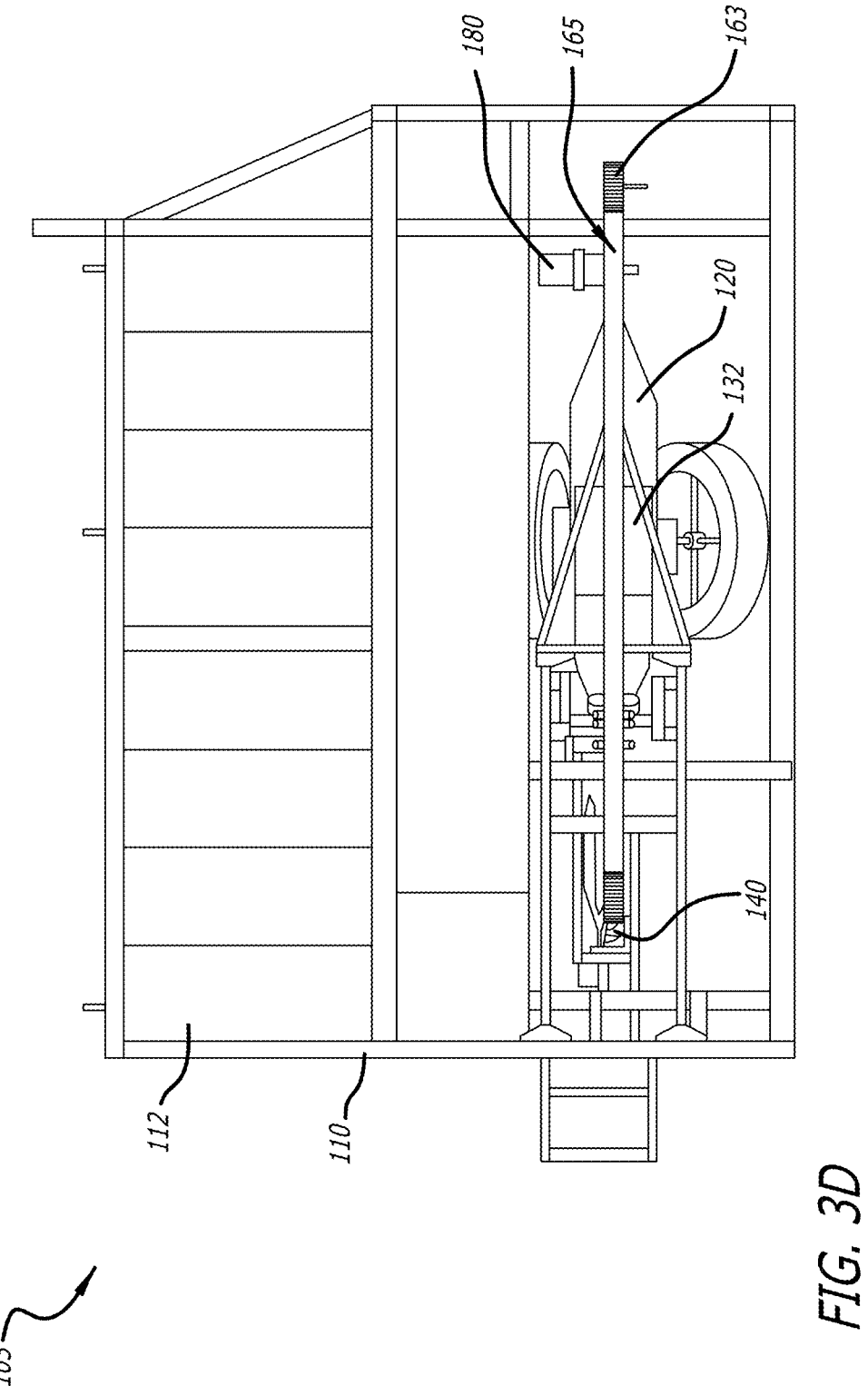

Referring now to FIGS. 2A-2B, a series of cross-sectional view illustrations of a slip 205 transplanted with the planter unit 110 are shown, in accordance with embodiments of the disclosure. It should be understood that the planter unit 110 depicted in FIG. 2A may be substantially similar to the planter unit 110 depicted above in FIG. 1. As shown in FIG. 2A, the planting unit 110 may utilize the closing wheels 132 to output the transplanted slip 250 planted within the soil (or ground) 210. Also, as illustrated in FIG. 2A, when/if the active depth control planting mode is implemented, one or more planting measurements may be measured/collected in order to actively adjust the planting depth that may have been used to output the transplanted slip 250. For example, the planting measurements may include: (i) a distance between the closing wheels 132 (as depicted with "D"), and (ii) a depth (or thickness) of the soil 210 (as depicted with "T"), which may also be measured with the distance between the top level of the soil 210 and the bottommost level of the closing wheels 132.

Similarly, as shown in greater detail in FIG. 2B, other planting measurements may be collected when the slip 205 was planted into the soil 210 (as depicted with circle "1" through circle "5"). Furthermore, as noted, the planter unit 110 may be capable of diagonal (or angled/tilted) planting which may limit the number of potatoes but promotes hypertrophy and enables harvesting in a short time. In some embodiments, the planter unit 110 may also be configured to plant any desired length of slips 205 (i.e., from short to long slips 205). For example, the planting depth (or insertion length) of the slip 205 may be easily adjusted by the planter unit 110 by the one or more operational modes discussed above. In addition, the planter unit 110 may be used for reliable planting that allows stable insertion lengths of the slips 205. Furthermore, as discussed above, the planter unit 110 may be configured for automated and dynamic depth tracking by implementing the sensor 146 and/or controller 146 depicted in FIG. 1. For example, prior to planting the slip 205, the planting unit 110 may have automatically detected the depth (or height) of the ridge in the soil 210, such that the wheels 132 (and/or any other predetermined mechanisms of the planter unit 110, including the sword 142 and furrow sword opener 141 of FIG. 1) may have been controlled automatically to move up and down based on any detected depth level difference.

Referring now to FIGS. 3A-3D, 4A-4D, 5-7, and 8A-8B depicted below, one or more implementations of the automated slip transplanter 103 are shown in accordance with embodiments of the disclosure. Accordingly, various examples of the automated slip transplanter 103 are illustrated below with regard to the embodiments depicted above in FIG. 1. As such, although FIGS. 3A-3D, 4A-4D, 5-7, and 8A-8B depict one or more specific views, illustrations, and/or configurations of the various components and subassemblies of the automated slip transplanter 103, it should be appreciated that any of the illustrated configurations of the respective Figures depicted below may comprise more/less mechanisms, one or more mechanisms positioned in different locations, and one or more mechanisms assembled with different techniques, without limitations.

Referring now to FIGS. 3A-3D, a series of isometric view illustrations of the planter unit 110 of the transplanter 103 are shown, in accordance with embodiments of the disclosure. It should be understood that the planter unit 110 of the transplanter 103 depicted in FIGS. 3A-3D may be substantially similar to the planter unit 110 of the transplanter 103 depicted above in FIGS. 1 and 2A. As such, any of the mechanisms and assemblies of the planter unit 110 depicted in FIGS. 3A-3D may be substantially similar to the respective mechanisms and assemblies of the planter unit 110 depicted in FIG. 1. Also, the planter unit 110 of the transplanter 103 depicted in FIG. 3A may be the same throughout the following FIGS. 3B-3D, with the exception that each of the FIGS. 3A-3D shows the planter unit 110 from a different viewing illustration.

Referring now to FIGS. 4A-4D, a series of exemplary screenshot illustrations of the singulation unit 190 of the transplanter 103 are shown, in accordance with embodiments of the disclosure. It should be understood that the singulation unit 190 of the transplanter 103 depicted in FIGS. 4A-4D may be substantially similar to the singulation unit 190 of the transplanter 103 depicted and discussed above in FIG. 1. As such, any of the mechanisms and assemblies of the singulation unit 190 and/or any other units and mechanisms of the transplanter 103 depicted in FIGS. 4A-4D may be similar to the respective mechanisms and assemblies of the transplanter 103 depicted in FIG. 1. Furthermore, the singulation unit 190 of the transplanter 103 depicted in FIG. 4A may be the same throughout the following FIGS. 4B-4C, with the exception that each of the FIGS. 4A-4C may show the singulation unit 190 from a different viewing illustration and may also include one or more mechanisms not previously shown for clarity purposes.

As shown in FIGS. 4A-4B, the singulation unit 190 may include, but is not limited to, a controller 405, a top body frame/chassis 411, a plurality of automated grippers 420 (or robotic arms, gantry assembly, etc.), and a plurality of slip cartridges 450 that are used to store the slips 205. As discussed above, when the singulation unit 190 is activated or in an "ON" mode (depicted with arrow "400"), the singulation unit 190 may implement the automated grippers 420 to singularly grasp the slips 205 from the slip cartridges 450 and then discharge (or release) the singulated slips 205 to the conveyor belt 160. Meanwhile, as shown in FIG. 4B, when the singulation unit 190 is idle or in an "OFF" mode (depicted with arrow "401"), the singulation unit 190 may retract the automated grippers 420 back to its starting position above the slip cartridges 450.

Figure 4C:
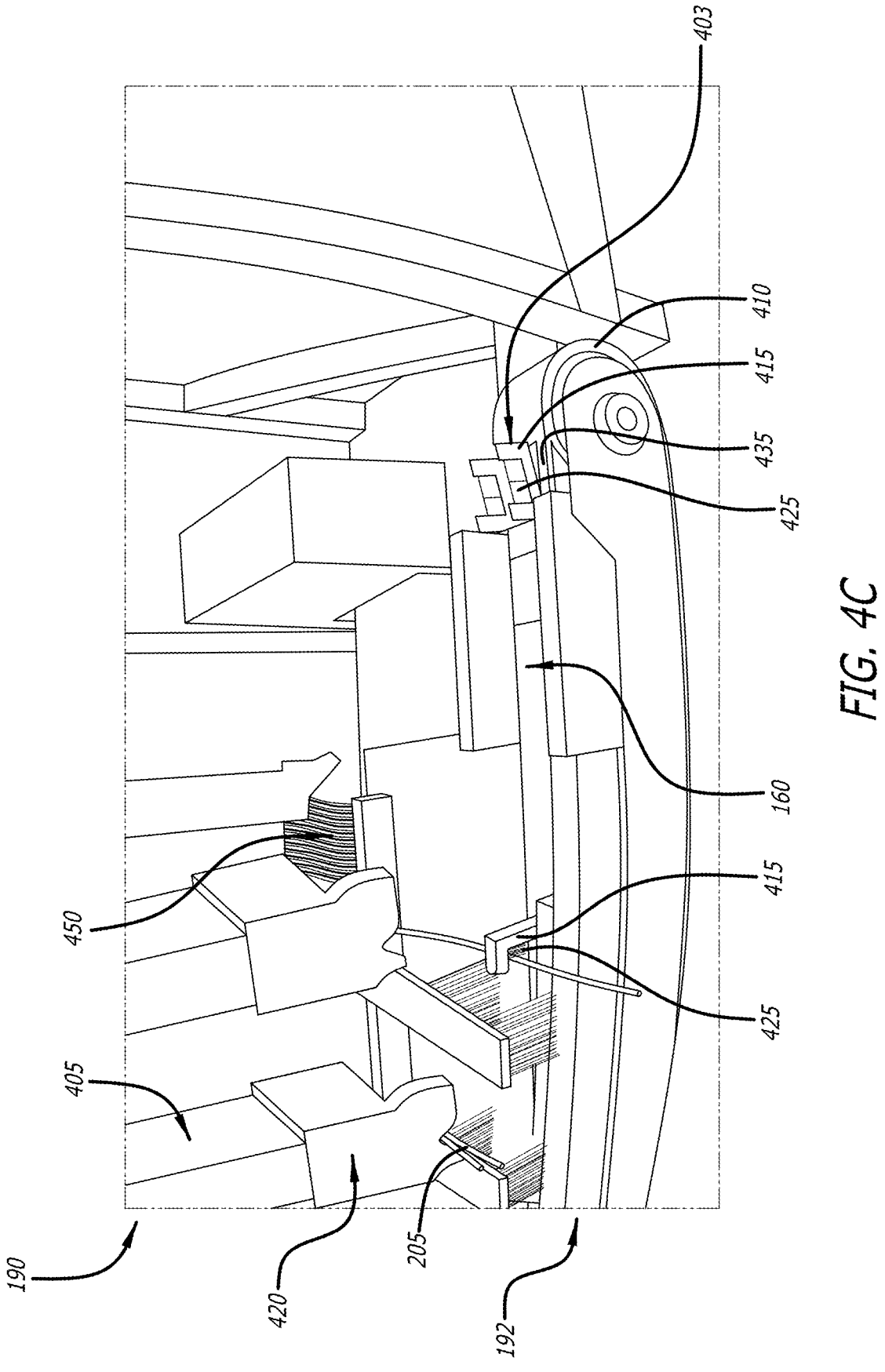
Figure 4D:
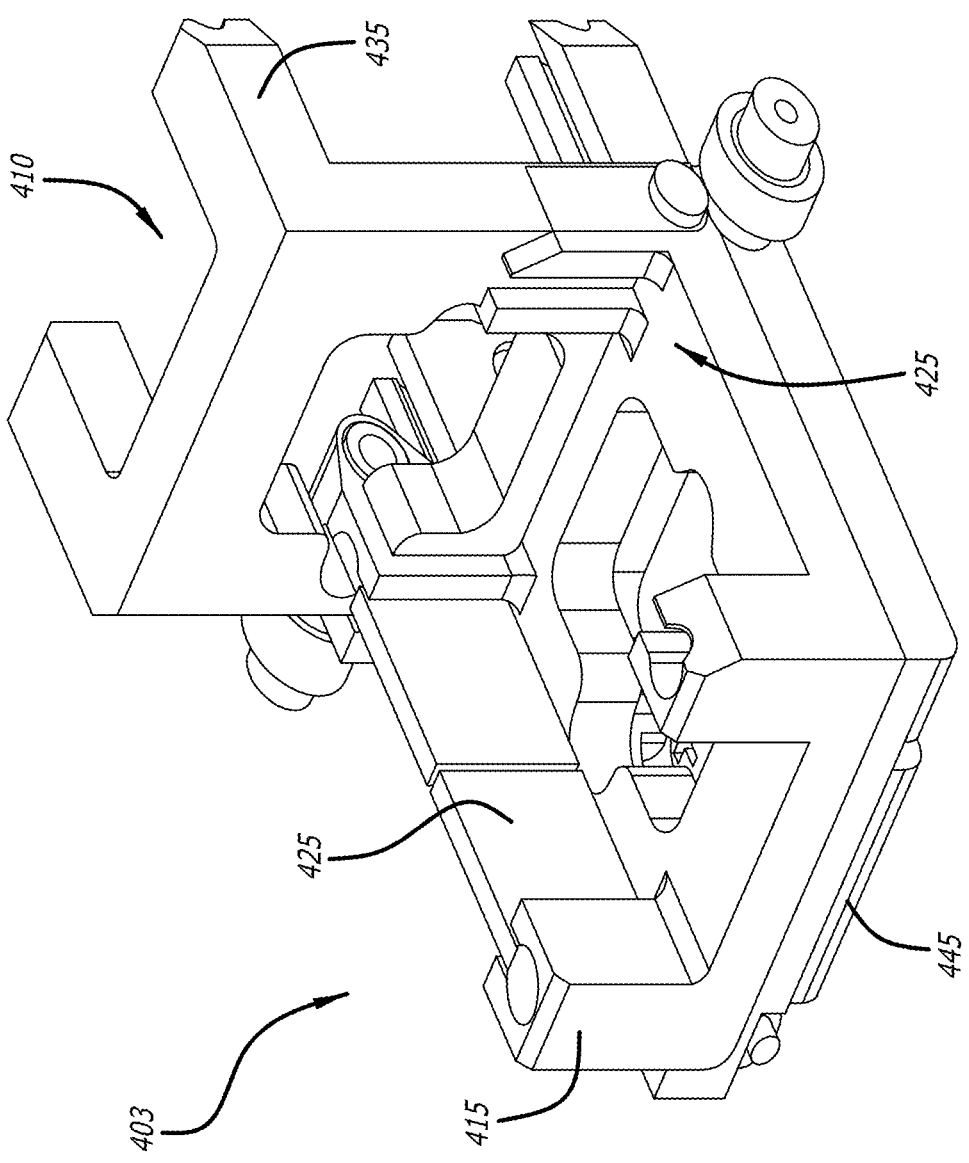

Now, as illustrated in FIGS. 4C-4D, the illustrated singulation unit 190 may be similar to the singulation unit 190 depicted above in FIGS. 4A-4B, with the exception that the belt holder assembly 403 may be better illustrated in FIG. 4C and in greater detail (as shown in FIG. 4D). For example, as shown in FIG. 4C, the conveyor belt 160 may be configured with a continuous belt 410 coupled (or hinged) to a plurality of brushed belt holder assemblies 403, where each brushed holder assembly 403 may receive one singulated slip 205 (as clearly shown in FIG. 4C) and then consistently transfer the singulated slips 205 towards the planter unit 110. According to most embodiments, as shown in FIG. 4C-4D, the brushed holder assembly 403 may include, but is not limited to, a slip bristle holder 415, bristle sections 425, a belt slip holder 435, and a belt holder base 445, where are all of the mechanisms are hinged together (as clearly shown in FIG. 4D) and operably coupled to the belt 410.

Furthermore, as shown in FIGS. 4A-4C, the node sensor 192 may be associated with the singulation unit 190, the conveyor belt 160, and the planter unit 110. In several embodiments, a controller (e.g., the controller 405, the controller 136 of FIG. 1, and/or the like) may be configured to actively control at least one or more of the planter unit 110, the singulation unit 190, and the conveyor belt 160 in order to dynamically adjust the planting slip rate (as discussed above in FIG. 1). In several embodiments, the controller may be configured to actively control and dynamically adjust the planting slip rate to maintain a predetermined overall planting slip rate. That is, the controller may be configured to actively control the transplanter 103 to dynamically increase or decrease the planting slip rate in order to maintain the predetermined overall planting slip rate. In some embodiments, the controller may. be configured to actively target a predetermined number of nodes per slip based on the predetermined overall planting slip rate and the performance data collected by the node sensor 192.

In most embodiments, the node sensor 192 may collect any desired number of performance data points, including, but not limited to, a node count, a singulation rate, a population value, a number of skipped slips, a number of multiple slips, a slip spacing rate (e.g., the spacing between planted slips), and a belt speed. Additionally, in several embodiments, the singulation unit 190 may further comprise a buffer system (e.g., as shown below with the buffer system 500 in FIG. 5), where the buffer system may be configured to implement slip rejection and buffering input operations to thereby facilitate the overall predetermined planting slip rate. According to most embodiments, the node sensor 192 may be a neural network and/or the like. However, in other embodiments, the node sensor 192 may be any type of monitoring and measuring device capable of implementing planting slip-rate prediction neural network processes and/or the like.

Referring now to FIG. 5, an exemplary screenshot illustration of a buffer system 500 of the singulation unit 190 of the transplanter 103 is shown, in accordance with embodiments of the disclosure. It should be understood that the singulation unit 190 of the transplanter 103 depicted in FIG. 5 may be substantially similar to the singulation unit 190 of the transplanter 103 depicted and discussed above in FIGS. 1 and 4A-4D. For example, any of the mechanisms and assemblies of the singulation unit 190 and/or any other units and mechanisms of the transplanter 103 depicted in FIG. 5 may be similar to the respective mechanisms and assemblies of the singulation unit 190 of the transplanter 103 depicted in FIGS. 4A-4D. As such, the conveyor belt 160, the singulation unit 190, and the brushed holder assembly 403 depicted in FIG. 5 may be the same as the conveyor belt 160, the singulation unit 190, and the brushed holder assembly 403 depicted in FIGS. 4A-4D, with the exception that FIG. 5 further illustrates the rail and turning wheel 510 implemented for the conveyor belt 160 and the singulation unit 190, as well as the buffer system 500 that helps to mitigate slip rejection and improve plant yield.

Referring now to FIG. 6, an exemplary screenshot illustration of an upper belt assembly 600 of the singulation unit 190 of the transplanter 103 is shown, in accordance with embodiments of the disclosure. It should be understood that the singulation unit 190 of the transplanter 103 depicted in FIG. 6 may be substantially similar to the singulation unit 190 of the transplanter 103 depicted and discussed above in FIGS. 1, 4A-4D, and 5. For example, any of the mechanisms and assemblies of the singulation unit 190 and/or any other units and mechanisms of the transplanter 103 depicted in FIG. 6 may be similar to the respective mechanisms and assemblies of the singulation unit 190 of the transplanter 103 depicted in FIGS. 4A-4D and 5. As such, the conveyor belt 160, the belt 410, the singulation unit 190, the brushed holder assembly 403, and the controller 405 depicted in FIG. 5 may be the same as the conveyor belt 160, the belt 410, the singulation unit 190, the brushed holder assembly 403, and the controller 405 depicted in FIGS. 1, 4A-4D, and 5, with the exception that FIG. 6 may provide a different viewing illustration.

Referring now to FIG. 7, an exemplary screenshot illustration of a main body frame 700 of the transplanter 103 is shown, in accordance with embodiments of the disclosure. It should be understood that the transplanter 103 depicted in FIG. 7 may be substantially similar to the transplanter 103 depicted in FIGS. 1, 3A-3D, 4A-4D, and 5-6. As such, the main body frame 700 of the transplanter 103 depicted in FIG. 7 may be similar to the top and bottom body frames 111 and 411 depicted in FIGS. 1 and 4A, with the exception that the backside of the slip cartridges 450 are shown and disposed (or located) on one or more stacked slip racks 710 (or shelves, platforms, etc.) of the main body frame 700, and that a controller 705 (or main controller box) is shown and may be configured to further control, manage, and power the transplanter 103. Also, it should be understood that any other controls, gauges, lines, actuators, and indicators may be incorporated into the controller 705, without limitations.

Referring now to FIGS. 8A-8B, a series of exemplary screenshot illustrations of the planter unit 110 of the transplanter 103 are shown, in accordance with embodiments of the disclosure. It should be understood that the planter unit 110 of the transplanter 103 depicted in FIGS. 8A-8B may be substantially similar to the planter unit 110 of the transplanter 103 depicted in FIGS. 1 and 3A-3D. For example, any of the mechanisms and assemblies of the planter unit 110 and/or any other units and mechanisms of the transplanter 103 depicted in FIGS. 8A-8B may be similar to the respective mechanisms and assemblies of the planter unit 110 of the transplanter 103 depicted in FIGS. 1 and 3A-3D. As such, the planter unit 110 depicted in FIGS. 8A-8B may be the same or substantially similar to the planter unit 110 depicted in FIGS. 1, 2A-2B, and 3A-3D, with the exception that FIG. 8A further illustrates an opening 810 (or furrow sword opening) formed by the sword assembly 140, and that FIG. 8B also illustrates the opening 810 from another viewing angle, which also shows the closing assembly 130 in conjunction with the open rail track 155 of the open rail assembly 150 planting two transplanted slips 205 in the opening 810.

Referring now to FIG. 9, a block diagram of an exemplary data processing system 900 is shown, in accordance with embodiments of the disclosure. In some embodiments, the data processing system 900 may be implemented with the automated transplanter 103 depicted in FIG. 1. As discussed above, the automated transplanter 103 may include one or more electronic components, modules, controllers, and/or any other similar data processing devices. In accordance with several embodiments, the automated transplanter 103 may house a variety of electronic devices, components, and/or circuitry, such as one or more processors, memory devices, and/or the like that may be configured to run software applications suitable for operating the automated transplanter 103 (e.g., the active depth controller 136, the sensor 146, the electrical controls and lines 405, the main controller 705, etc.).

To this end, the exemplary embodiments of the data processing system 900 may be used in conjunction with the automated transplanter 103 to perform any of the processes or methods described herein. The data processing system 900 may represent circuitry associated with the one or more electrical controllers (or devices) of the transplanter 103, a desktop, a tablet, a server, a mobile phone, a personal digital assistant (PDA), a personal communicator, a network router or hub, a wireless access point (AP), a repeater, a set-top box, and/or any combination thereof. In an embodiment, the data processing system 900 may include one or more processor(s) 924 and a peripheral interface 928, also referred to herein as a chipset, to couple various components to the processor(s) 924, including a memory 932 and devices 936-948 via a bus or an interconnect. Processor(s) 924 may represent a single processor or multiple processors with a single processor core or multiple processor cores included therein. Processor(s) 924 may represent one or more general-purpose processors such as a microprocessor, a central processing unit (CPU), or the like.

More particularly, the processor(s) 924 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processor(s) may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. The processor(s) may be configured to execute instructions for performing the operations and steps discussed herein.

In several embodiments, the peripheral interface 928 may include a memory control hub (MCH) and an input output control hub (ICH). The peripheral interface 928 may include a memory controller (not shown) that communicates with a memory 932. The peripheral interface 928 may also include a graphics interface that communicates with graphics subsystem 934, which may include a display controller and/or a display device. The peripheral interface 928 may communicate with the graphics device 934 by way of an accelerated graphics port (AGP), a peripheral component interconnect (PCI) express bus, or any other type of interconnects.

An MCH may generally be referred to as a Northbridge, and similarly an ICH may generally be referred to as a Southbridge. As used herein, the terms MCH, ICH, Northbridge and Southbridge are intended to be interpreted broadly to cover various chips that perform functions including passing interrupt signals toward a processor. In some embodiments, the MCH may be integrated with the processor 924. In such a configuration, the peripheral interface 928 operates as an interface chip performing some functions of the MCH and ICH. Furthermore, a graphics accelerator may be integrated within the MCH or the processor(S0 924.

In most embodiments, the memory 932 may include one or more volatile storage (or memory) devices, such as random access memory (RAM), dynamic RAM (DRAM), synchronous DRAM (SDRAM), static RAM (SRAM), and/or any other similar types of storage devices. The memory 932 may store information including sequences of instructions that are executed by the processor 924, and/or any other device. For example, executable code and/or data of a variety of operating systems, device drivers, firmware (e.g., input output basic system or BIOS), and/or applications can be loaded in the memory 932 and executed by the one or more processors 924. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

In many embodiments, the peripheral interface 928 may provide an interface to IO devices, such as the devices 936-948, including wireless transceiver(s) 936, input device(s) 940, audio IO device(s) 944, and other IO devices 948. The wireless transceiver 936 may be a WiFi transceiver, an infrared transceiver, a Bluetooth transceiver, a WiMax transceiver, a wireless cellular telephony transceiver, a satellite transceiver (e.g., a global positioning system (GPS) transceiver) or a combination thereof. The input device(s) 940 may include a mouse, a touch pad, a touch sensitive screen (e.g., such screen may be integrated with the display device 934), a pointer device such as a stylus, and/or a keyboard (e.g., physical keyboard or a virtual keyboard displayed as part of a touch sensitive screen). For example, the input device 940 may include a touch screen controller coupled with a touch screen. The touch screen and touch screen controller may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

In several embodiments, the audio IO 944 may include a speaker and/or a microphone to facilitate voice-enabled functions, such as voice recognition, voice replication, digital recording, and/or telephony functions. Other optional devices 948 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), and/or a combination thereof. These optional devices 948 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Although one or more specified components of the data processing system 900 are depicted in FIG. 9, it should be understood that they are not intended to represent any particular architecture and/or manner of interconnecting any of those components, as such details are not germane to embodiments of the present disclosure. It should also be appreciated that network computers, handheld computers, mobile phones, and/or other data processing systems, which have fewer components or perhaps more components, may also be used with embodiments of the invention disclosed hereinabove.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it should be appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g., circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. An automated slip transplanter, comprising:
a planter unit configured to plant a consistent row of evenly spaced slips in a field;
a singulation unit having a plurality of automated grippers and a plurality of slip cartridges, the singulation unit configured to continuously singulate harvested slips that are stored in the plurality of slip cartridges;
a conveyor belt having a belt and a plurality of brushed holders, the plurality of brushed holders pivotally disposed on the belt, wherein the plurality of brushed holders are configured to receive the singulated slips from the plurality of automated grippers, and the belt is configured to transfer the received slips to the planter unit;
a node sensor associated with the planter unit, the singulation unit, and the conveyor belt, the node sensor configured to autonomously monitor the singulated slips as they are transferred throughout the automated slip transplanter and collect performance data of the singulated slips in real-time; and
a controller communicatively coupled to the node sensor, the controller configured to implement one or more operational modes and dynamically adjust a planting slip rate based on the one or more operational modes and the performance data collected by the node sensor wherein, when an active depth control planting mode is implemented, the controller is further configured to dynamically adjust a planting depth of the slips based on one or more planting measurements collected during planting.

2. The automated slip transplanter of claim 1, wherein the controller is configured to actively control at least one or more of the planter unit, the singulation unit, and the conveyor belt in order to dynamically adjust the planting slip rate.

3. The automated slip transplanter of claim 2, wherein the controller actively controls and dynamically adjusts the planting slip rate to maintain a predetermined overall planting slip rate.

4. The automated slip transplanter of claim 3, wherein the controller is configured to actively target a predetermined number of nodes per slip based on the predetermined overall planting slip rate and the performance data collected by the node sensor.

5. The automated slip transplanter of claim 1, wherein the planter unit comprises a sword assembly and an open rail assembly, wherein the conveyor belt is configured to sequentially transfer the received slips to an open rail track of the open rail assembly, and wherein the open rail track is configured to deliver the singulated slips to the sword assembly, such that the sword assembly thereby plants the consistent row of evenly spaced slips in the field.

6. The automated slip transplanter of claim 1, wherein the performance data comprises at least one or more of a node count, a singulation rate, a population value, a number of skipped slips, a number of multiple slips, a slip spacing rate, and a belt speed.

7. The automated slip transplanter of claim 1, wherein the conveyor belt is operably coupled to the singulation unit and the planter unit, wherein the singulation unit is vertically disposed on the planter unit, and wherein each of the plurality of automated grippers are configured to singularly grasp a harvested slip from one of the plurality of slip cartridges and discharge each of the singulated slips on the conveyor belt.

8. The automated slip transplanter of claim 3, wherein the singulation unit further comprises a buffer system, and wherein the buffer system is configured to implement slip rejection and buffering input operations to thereby facilitate the overall predetermined planting slip rate.

9. The automated slip transplanter of claim 1, wherein the one or more operational modes comprise an active depth control planting mode and an active node control planting mode.

10. The automated slip transplanter of claim 1, wherein the node sensor comprises a monitoring device configured to implement a planting slip-rate prediction neural network.

11. A transplanting system, comprising:

an articulator supported by one or more drive wheels;

an automated slip transplanter mounted to the articulator, wherein the automated slip transplanter has a first hitch that is pivotally hitched to a second hitch of the articular; and a plurality of harvested slips disposed in a plurality of slip cartridges, the plurality of slip cartridges arranged in one or more rows of slip cartridges that are stacked in a main body frame of the automated slip transplanter, wherein the main body frame comprises a top body frame vertically disposed over a bottom body frame;

wherein the automated slip transplanter further comprises:

a planter unit configured to plant a plurality of consistent row of evenly spaced slips in a field;

a singulation unit having a plurality of automated grippers and a plurality of slip cartridges, the singulation unit configured to continuously singulate harvested slips that are stored in the plurality of slip cartridges;

a conveyor belt having a belt and a plurality of brushed holders, the plurality of brushed holders pivotally disposed on the belt, wherein the plurality of brushed holders are configured to receive the singulated slips from the plurality of automated grippers, and the belt is configured to transfer the received slips to the planter unit;

a node sensor associated with the planter unit, the singulation unit, and the conveyor belt, the node sensor configured to autonomously monitor the singulated slips as they are transferred throughout the automated slip transplanter and collect performance data of the singulated slips in real-time; and a controller communicatively coupled to the node sensor, the controller configured to implement one or more operational modes and dynamically adjust a planting slip rate based on the one or more operational modes and the performance data collected by the node sensor, wherein, when an active depth control planting mode is selected, the controller dynamically adjusts a planting depth of the slips based on one or more planting measurements collected during planting.

12. The transplanting system of claim 11, wherein the controller is configured to actively control at least one or more of the planter unit, the singulation unit, and the conveyor belt in order to dynamically adjust the planting slip rate.

13. The transplanting system of claim 12, wherein the controller actively controls and dynamically adjusts the planting slip rate to maintain a predetermined overall planting slip rate.

14. The transplanting system of claim 13, wherein the controller is configured to actively target a predetermined number of nodes per slip based on the predetermined overall planting slip rate and the performance data collected by the node sensor.

15. The transplanting system of claim 11, wherein the planter unit comprises a sword assembly and an open rail assembly, wherein the conveyor belt is configured to sequentially transfer the received slips to an open rail track of the open rail assembly, and wherein the open rail track is configured to deliver the singulated slips to the sword assembly, such that the sword assembly thereby plants the consistent row of evenly spaced slips in the field.

16. The transplanting system of claim 11, wherein the performance data comprises at least one or more of a node count, a singulation rate, a population value, a number of skipped slips, a number of multiple slips, a slip spacing rate, and a belt speed.

17. The transplanting system of claim 11, wherein the conveyor belt is operably coupled to the singulation unit and the planter unit, wherein the singulation unit is vertically disposed on the planter unit, and wherein each of the plurality of automated grippers are configured to singularly grasp a harvested slip from one of the plurality of slip cartridges and discharge each of the singulated slips onto the conveyor belt.

18. The transplanting system of claim 13, wherein the singulation unit further comprises a buffer system, and wherein the buffer system is configured to implement slip rejection and buffering input operations to thereby facilitate the overall predetermined planting slip rate.

19. The transplanting system of claim 11, wherein the one or more operational modes comprise an active depth control planting mode and an active node control planting mode, and wherein the node sensor comprises a monitoring device configured to implement a planting slip-rate prediction neural network.

20. A method for transplanting harvested slips with an automated slip transplanter, comprising:

continuously singulating harvested slips from a plurality of slip cartridges in a singulation unit of automated slip transplanter, wherein the singulation unit comprises a plurality of automated grippers;

transferring the singulated slips from the plurality of slip cartridges with the plurality of automated grippers and discharging the singulated slips on a conveyor belt, wherein the conveyor belt comprises a plurality of brushed holders pivotally disposed on a belt;

receiving the singulated slips with the plurality of brushed holders and transferring the received slips on the belt to a planter unit of the automated slip transplanter;

autonomously collecting performance data of the singulated slips in real-time with a node sensor, wherein the node sensor is associated with the planter unit, the singulation unit, and the conveyor belt;

monitoring the singulated slips as they are transferred throughout the automated slip transplanter;

dynamically adjusting a planting slip rate with a controller that is communicatively coupled to the node sensor, the controller is configured to implement one or more operational modes, wherein the planting slip rate is dynamically adjusted by the controller based on the one or more operations modes and the performance data collected by the node sensor; and planting a plurality of consistent rows of evenly spaced slips in a field with the planter unit of the automated slip transplanter based on the planting slip rate; wherein, when an active depth control planting mode is selected, the controller dynamically adjusts a planting depth of the slips based on one or more planting measurements collected during planting.

* * * * *